US012041059B1

(12) United States Patent
Simic et al.

(10) Patent No.: US 12,041,059 B1
(45) Date of Patent: Jul. 16, 2024

(54) DEVICE ENROLLMENT IDENTITY VERIFICATION

(71) Applicant: HYPR Corp., New York, NY (US)

(72) Inventors: Bojan Simic, New York, NY (US); Roman Kadinsky, New York, NY (US); Baljeet Sandhu, New York, NY (US); Ryan Rowcliffe, New York, NY (US)

(73) Assignee: HYPR Corp., New York, NY (US)

( * ) Notice: Subject to any disclaimer, the term of this patent is extended or adjusted under 35 U.S.C. 154(b) by 0 days.

(21) Appl. No.: 18/220,694

(22) Filed: Jul. 11, 2023

(51) Int. Cl.
*H04L 9/40* (2022.01)
*H04L 9/32* (2006.01)
*H04W 12/06* (2021.01)

(52) U.S. Cl.
CPC ............ *H04L 63/102* (2013.01); *H04L 9/321* (2013.01); *H04L 9/3234* (2013.01); *H04L 9/3247* (2013.01); *H04L 63/0807* (2013.01); *H04L 63/0823* (2013.01); *H04L 63/083* (2013.01); *H04L 63/0876* (2013.01); *H04W 12/06* (2013.01); *H04W 12/068* (2021.01)

(58) Field of Classification Search
CPC .... H04L 63/102; H04L 9/3234; H04L 9/3247
See application file for complete search history.

(56) References Cited

U.S. PATENT DOCUMENTS

| | | | |
|---|---|---|---|
| 9,197,638 B1* | 11/2015 | Livesay | H04L 63/0807 |
| 9,225,828 B1* | 12/2015 | Garcia | H04M 3/385 |
| 10,452,897 B1* | 10/2019 | Benkreira | G06V 20/62 |
| 10,678,939 B2* | 6/2020 | Eckel | G06F 21/31 |
| 10,936,857 B2* | 3/2021 | Benkreira | G06F 21/32 |
| 11,089,474 B2* | 8/2021 | Maheshwari | H04W 4/50 |
| 11,120,450 B1* | 9/2021 | Buckingham | G06Q 20/40145 |
| 11,405,189 B1* | 8/2022 | Bennison | H04L 9/0656 |
| 11,593,807 B2* | 2/2023 | Mudumbai Srinivasa | G06K 19/06028 |
| 2016/0269379 A1* | 9/2016 | Livesay | H04L 63/0861 |
| 2017/0237731 A1* | 8/2017 | Ganesan | H04W 12/068 726/7 |
| 2017/0286768 A1* | 10/2017 | Livesay | H04W 12/02 |
| 2017/0351909 A1* | 12/2017 | Kaehler | G06V 20/20 |
| 2018/0124047 A1* | 5/2018 | Fisher | H04L 63/0861 |
| 2019/0097812 A1* | 3/2019 | Toth | H04L 9/0841 |
| 2022/0255945 A1* | 8/2022 | Guan | H04L 63/102 |

* cited by examiner

*Primary Examiner* — James R Turchen
(74) *Attorney, Agent, or Firm* — Pillsbury Winthrop Shaw Pittman, LLP

(57) ABSTRACT

Provided are systems, processes, and methods for identity management, such as the verification of an identity of a user of device for securely onboarding a device remotely and other use cases. A user may access a webpage or obtain a native application on their device with which the user engages to prove their identity to an identity verifier delegated to attest to the identity of the user. A communication session is established between the user and the identity verifier via their respective devices. If the identity verifier attests to the asserted identity of the user, the device of the user may be issued a deep link, code, or other for the establishment or exchange of credential information with an identity management system. Embodiments of such systems may also be used for other instances of identity or device verification.

40 Claims, 10 Drawing Sheets

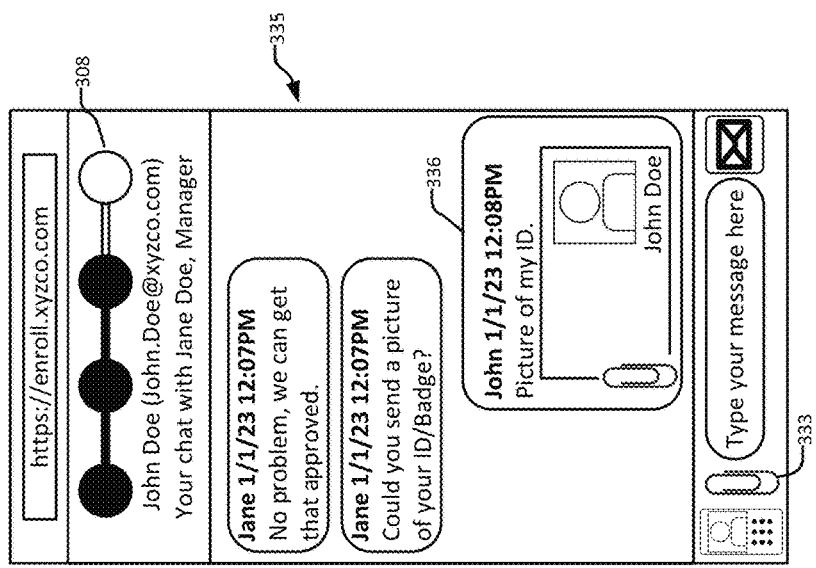
FIG. 3H
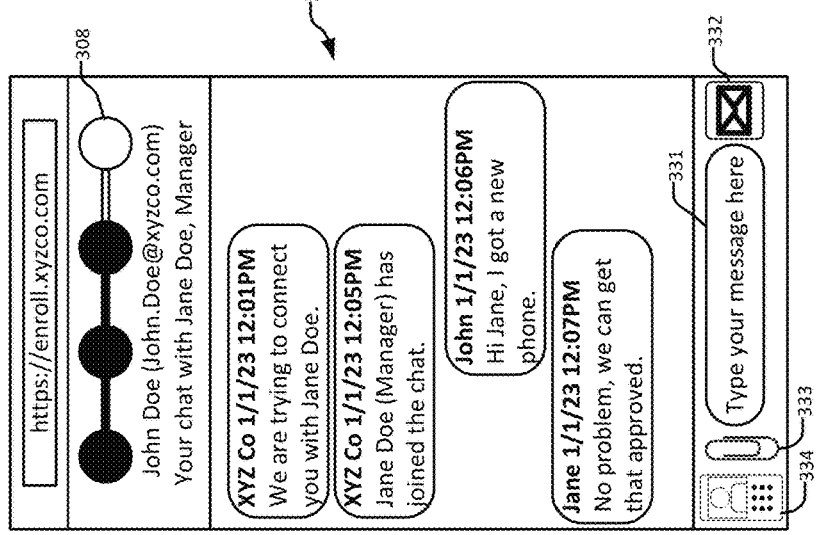
FIG. 3G
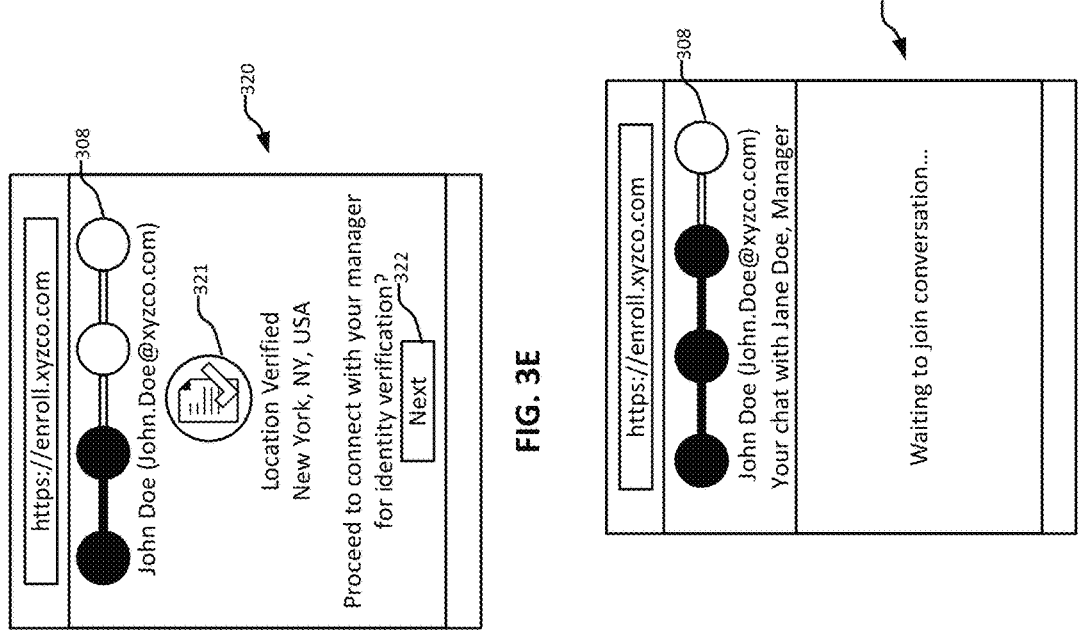
FIG. 3E
FIG. 3F

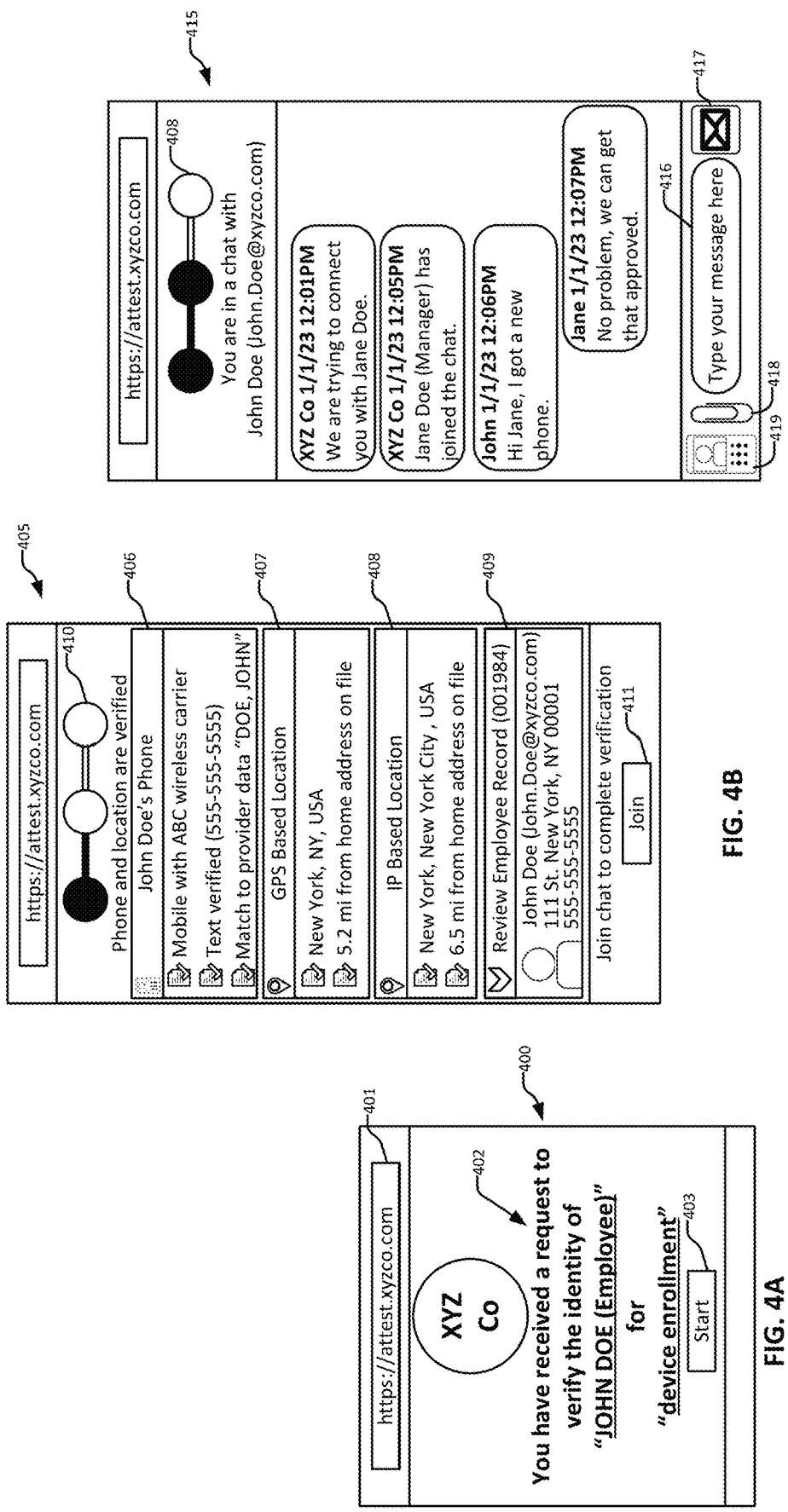

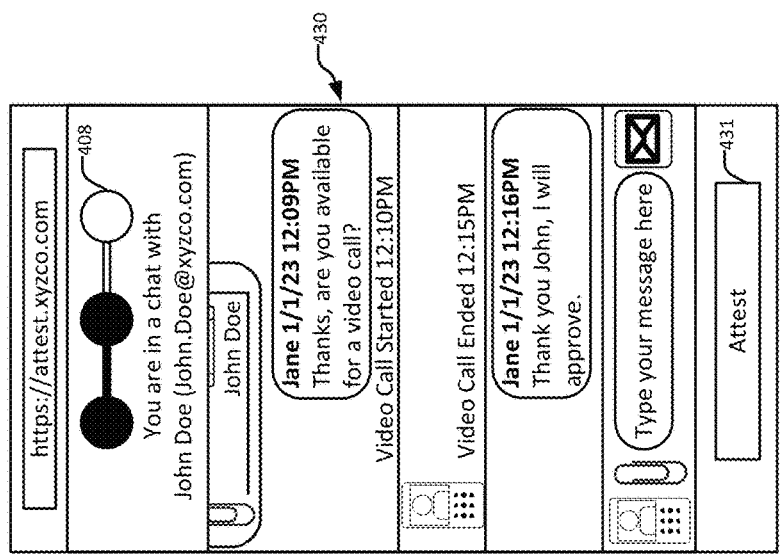

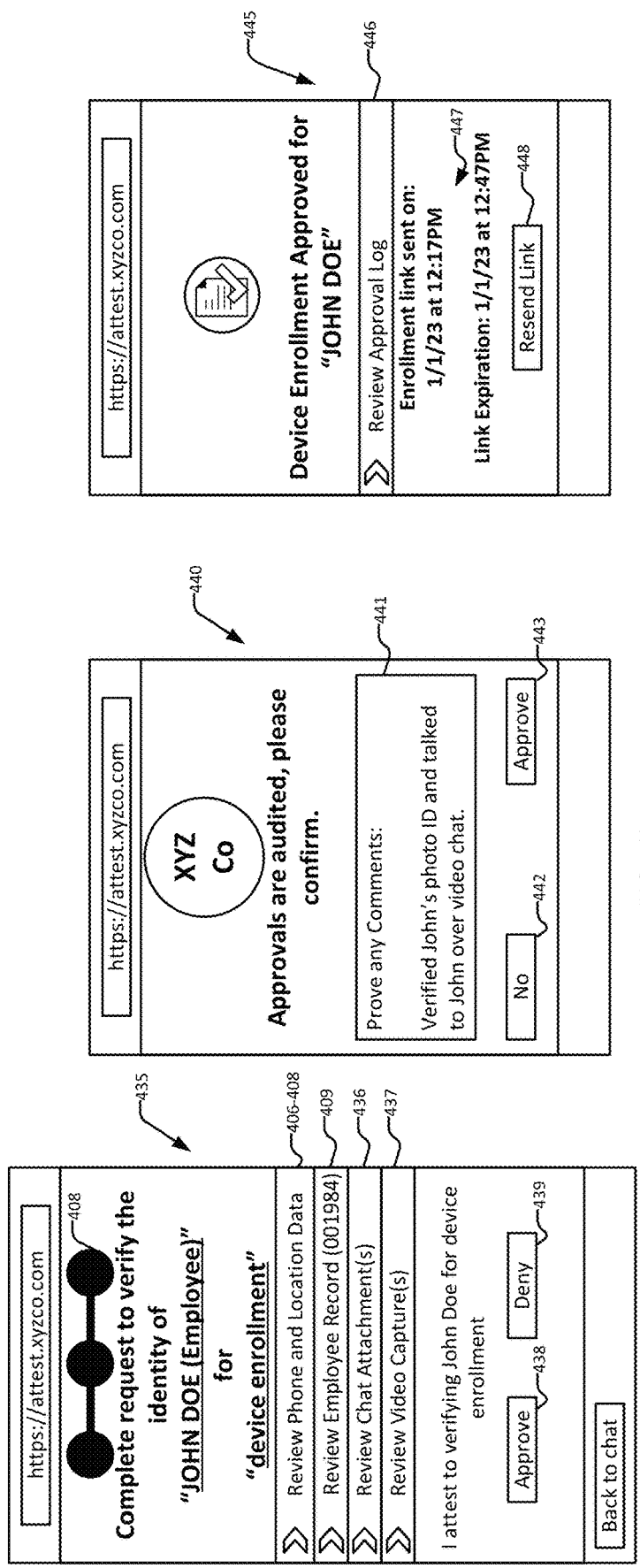

DEVICE ENROLLMENT IDENTITY VERIFICATION

RELATED APPLICATIONS

No cross-reference is presented at this time.

BACKGROUND

1. Field

The present disclosure relates generally to cybersecurity and, more specifically, to identity management techniques leveraging mobile devices of users.

2. Description of the Related Art

Many computer systems and resources thereon are protected with identity management systems. These systems are designed to ensure that access to computer systems and resources is granted only to the appropriate entities and denied to others. Examples include computer program code in a client/server architecture that verifies that a user submitted password corresponds to an identifier supplied by the user before granting access to resources associated with that user identifier. Other approaches apply federated identity management, such as arrangements between multiple enterprises or another third-party to allow users to use identification data from one platform to obtain access on another platform.

Credentials asserted by a device to identity management systems to access protected computer systems and resources often correspond to the device and, in many cases, are specific to that device. For example, credentials or identifiers corresponding to a device in combination with credentials of a user may be used to permit access to resources. Many implementations of identity management systems with strict security rely on the onboarding of a device of a user (e.g., enrollment) by which credentials are established. For example, prior to permitting a user to access resources, like an email server, via their device, that device must be enrolled by the identify management system. As a result, these identity management systems are effective in preventing access to resources by unauthorized devices. However, enrollment requirements can encumber IT teams and users when users need to access resources from a new or different device.

SUMMARY

The following is a non-exhaustive listing of some aspects of the present techniques. These and other aspects are described in the following disclosure.

In some aspects, a process to verify an identity of a user includes receiving a request to verify an identity of a user from a device of the user; receiving, from the device of the user, an initial user identifier by which a record associated with an asserted user identity is identifiable; obtaining, from the device of the user, at least two device verification values; obtaining, based on the record associated with the asserted user identity, verifying device information corresponding to a verifying user having permissions to attest to the identity of the user; issuing, to the verifying device, a notification indicative of a pending identity verification request corresponding to the user; receiving, from the verifying device, a selection to establish a communication session with the device of the user and providing for review by the verifying user on the verifying device the at least two device verification values; establishing a chat session between the verifying device and the device of the user, wherein: at least one attachment is detected as being uploaded by the device of the user; and at least one audio or video communication session is detected between the verifying device and the device of the user; after the detecting, receiving a selection performed by the verifying user on the verifying device to attest to the identity of the user as being the asserted user identity; and in response to receiving the selection attesting to the identity of the user, permissioning establishment of a credential on the device of the user for the asserted user identity.

Some aspects include a tangible, non-transitory, machine-readable medium storing instructions that when executed by a data processing apparatus cause the data processing apparatus to perform operations of one or more of the above-mentioned processes and computer-implemented methods.

Some aspects include a system, including: one or more processors; and memory storing instructions that when executed by the processors cause the processors to effectuate operations of one or more of the above-mentioned processes and computer-implemented methods.

BRIEF DESCRIPTION OF THE DRAWINGS

The above-mentioned aspects and other aspects of the present techniques will be better understood when the present application is read in view of the following figures in which like numbers indicate similar or identical elements:

FIG. 3A, FIG. 3B, FIG. 3C, FIG. 3D, FIG. 3E, FIG. 3F, FIG. 3G, FIG. 3H, FIG. 3I, FIG. 3J, and FIG. 3K illustrate example interfaces of an application for enrollment of a new device, subject to identity verification, in accordance with some example embodiments.

FIG. 4A, FIG. 4B, FIG. 4C, FIG. 4D, FIG. 4E, FIG. 4F, FIG. 4G, FIG. 4H, and FIG. 4I illustrate example interfaces of an application for approving enrollment of a new device, subject to identity verification, in accordance with some example embodiments.

Figure 1:
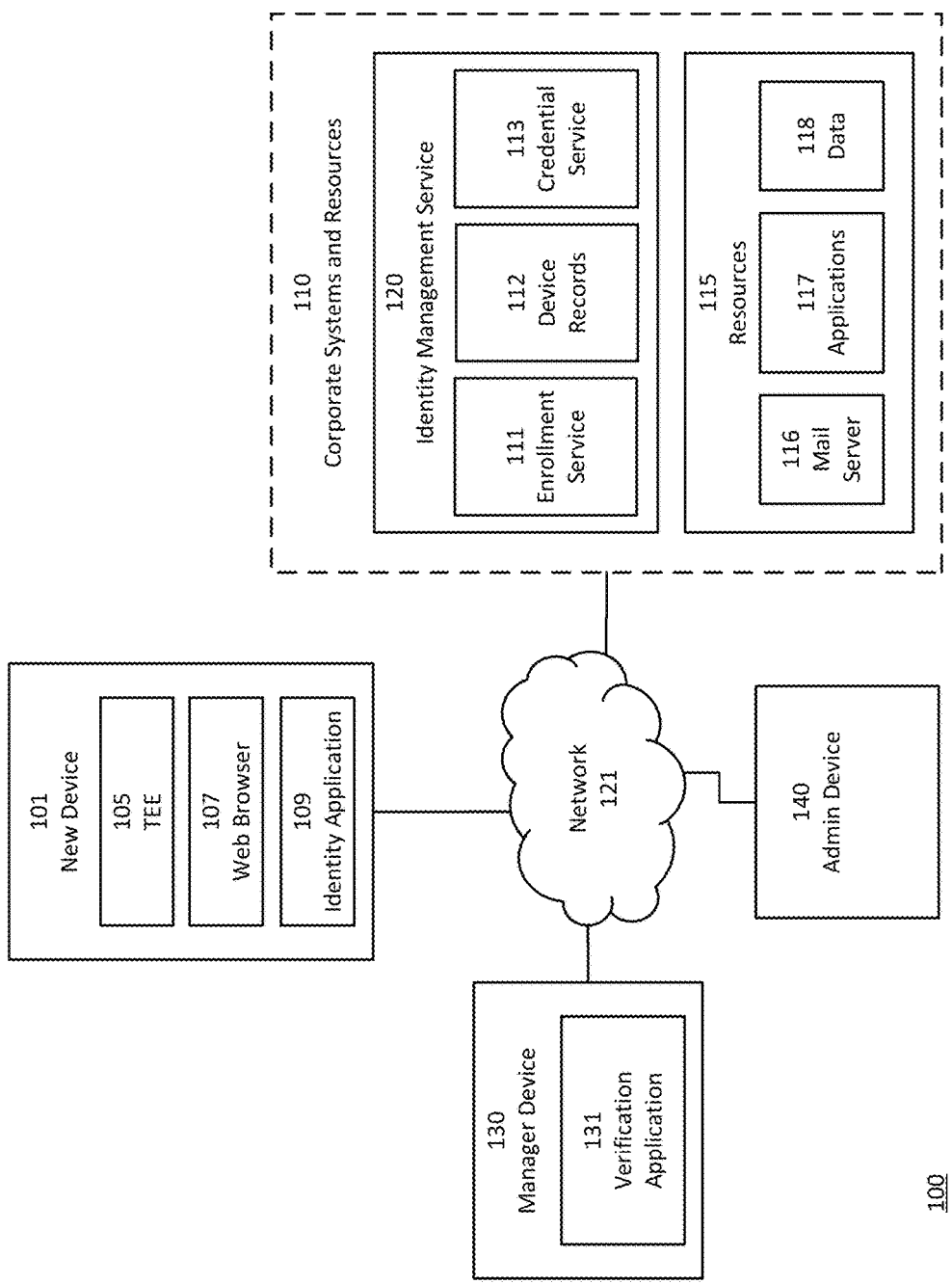
FIG. 1 illustrates an example computing environment within which a device enrollment service may be implemented in accordance with the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of identity management systems. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many existing identity management systems are potentially subject to vulnerabilities. Examples include attacks that compromise a device by which a user remotely accesses resources. Some existing systems are potentially vulnerable to malicious code executing on the user's mobile device that, for example, capture user supplied credentials from system memory allocated to client-side authentication applications. Other attacks may be fishing or spearfishing attacks targeted to IT teams, such as to attempt to get an IT team member to authorize a device for access to resources or authorize a device running malicious code. Corporations and other entities, and IT teams are often cognizant of these types of attacks and have, in many cases, implemented stringent protocols that place a lot of friction on employees (or users) and IT teams. One example of a high-friction process is the onboarding of a (e.g., new or replacement) device to an identity management system.

Oftentimes, an onboarding process to enroll a device involves the establishment of a device certificate (or cryptographic keys) for the device in compliance with an authentication policy of an identity management system and the storing of information about the device certificate (or cryptographic keys) by the system for verification of the device. Access to the device certificate (or cryptographic keys) on the device may be permitted upon authentication of the user by the device. Example device certificates may be based on public/private key infrastructure, with the device being issued a certificate and maintaining a private key corresponding to the certificate on the device. An identity management system may store information about the device certificate, like the certificate or a public key corresponding to the certificate, by which the certificate or other information signed (or encrypted) by the device (e.g., using the private key) may be verified. Thus, for example, IT teams are frequently tasked with verifying the identity of a user (e.g., in person) and user possession of a device prior to manually requesting (or causing) a device certificate to be issued or approved for the device of the user such that the user can remotely access resources with their device.

Onboarding a device, whether for a new user or an existing user who obtained a new or replacement device, to an identity management system can be cumbersome. In many cases, a user must contact an IT team to onboard their device, such as by physically taking their device to an IT team member who may inspect the device and open a ticket to request enrollment of the device (or enroll the device). In some examples, the IT team member may install software, verify or change device settings, or otherwise configure the device for enrollment. A ticket to enroll a device may be closed by an identity management system administrator or other IT team member having permissioned access to a utility or system for establishing credentials to onboard the device. In some examples, this may require further IT team member actions on the device, such as verifying or otherwise configuring device settings in compliance with remote management policy (e.g., such that a command may be transmitted by the identity management system to wipe the device remotely) prior to permissioning the device for remote access (e.g., subject to authentication of the device or user).

Some embodiments mitigate these issues by providing a system, like an identity management system or service of an identity management system, for securely onboarding a device remotely. For example, an employee (e.g., a user) may access a webpage or obtain a native application on their (new) device with which the user engages to prove their identity to a manager or other person delegated to attest to the identity of the user. If the manager attests to the identity of the user, the new device of the user may be onboarded, such as via deep link, code, or other mechanism for the establishment or exchange of credential information with an identity management system. Embodiments of such systems may also be used for other instances of identity or device verification. For example, it may be desirable to verify that a given individual is in possession of a device by which an activity (e.g., like opening of an account, digitally signing documents, etc.) is performed to mitigate liability—like exposure to identity theft. Embodiments of systems may provide for the efficient verification of a device and user possession of the device, such as prior to affording some privilege to the device (e.g., access to resources or systems). Some embodiments may confer certain privileges for a limited time after verification, for example, a user might be required to complete an onboarding process within a threshold period of time or access to a resource (e.g., like a document to digitally sign or option to confirm registration of account) may be conferred for a limited period of time.

FIG. 1 illustrates an example computing environment 100 within which a device enrollment service may be implemented in accordance with the present techniques. In some embodiments, the computing environment 100 may include a device 101, like a new personal device of a user or new device issued to a user, a manager device 130, an admin device 140, and various corporate systems and resources 110. These components may communicate with one another via a network 121, such as the Internet and various other local area networks, which is not to suggest that each entity must communicate with each other entity.

In some embodiments, device 101 may be a new device of a user (e.g., employee) that must be enrolled prior to being permitted access to corporate systems and resources 110. For example, employees may use a personal (or issued) device to access email via a mail server 116, access one or more applications 117 (or APIs thereof), or other data 118 (e.g., files stored on a network drive). Access to corporate systems and resources 110, such as those mentioned above and others, may be limited to only those devices authorized by an identity management service. In the case of a personal device of a user, new device 101 is usually unknown to corporate systems. In the case of an issued device, an employee may be drop-shipped a replacement device (e.g., by the device manufacturer or retailer) that is unknown to corporate systems (e.g., similar to a personal device). In other examples, issued devices may be sent to users by IT teams in varying states of enrollment, requiring some or all portions of an enrollment process. For example, in some contexts, and especially in view of the present techniques that provide remote onboarding processes, the issuance of devices that have not (or have only been partially) enrolled may be encouraged to mitigate the various possible security issues of mailing an enrolled device.

Examples of device 101 may include, but are not limited to a (e.g., new) mobile device to a user, like a highly portable smartphone or tablet. Other example devices 101 may include, but are not limited to, laptop or tablet type personal computing devices. More generally, portable devices that are often carried by users during their day-to-day activities are common representative embodiments of a device 101. Such devices, in many cases, include a trusted execution environment (TEE) 105. In some (or other) cases, although not shown, a trusted execution environment may be an external, portable device capable of being coupled via a bus, like USB, to a device including a suitable interface. Commonly, smartphone and tablet type devices—and now many highly portable laptops and tablet type personal computers—given their portability, are likely to include integration of trusted execution environments, such as for secure payments, digital currency wallets, and the like. A trusted execution environment, whether integrated to device 101, or provided by separate external portable device, may be leveraged for the management and access of on-device credentials—such as private keys, certificates, user biometrics, etc.—in a secure fashion. The above should not be construed to rule out other portable mobile computing devices, such as wearables, like watches or bracelets, that as they become more prevalent may be as equally suited as a smartphone or tablet device for standalone access to some or all corporate systems and resources 110. As an example, it may be desirable in some cases for a user to access their email account from their watch as a standalone device.

Embodiments of a trusted execution environment 105 may include any isolated execution environment, which may run in parallel (e.g., concurrently with) with a client execution environment (CEE), e.g., a process executed in the context of the OS and having a distinct virtual address space assigned within the physical address space of the memory to which the CPU is connected via a memory bus. Compared to a user-facing client execution environment, which may execute the device operating system and most user-facing applications (such as web browser 107 or an identity application 109), the trusted execution environment 105 is expected to be more secure and may execute a subset of specific applications (e.g., applications, services, and/or software modules) on the device, like trusted applications or modules for authentication operations, which may include user authentication, payments, digital rights management, and the like. Some of those authentication operations may be performed in an out-of-band (e.g., external to a channel by which the primary computing device requests authentication) authentication process, such as for granting user access to online resources and other assets, payments, digital rights management, and the like. Additionally, a trusted execution environment 105 may store within and/or cryptographically sign data associated with those applications or modules within the trusted execution environment, such as to protect the data from being tampered with, read, and/or modified by an unauthorized entity.

In some embodiments, a trusted execution environment 105 may perform one or more operations responsive to requests received at an interface by which one or more applications within a user-facing client execution environment (e.g., a web browser 107 or identity application 109) may request data from and/or provide data to the trusted execution environment, such as to utilize one or more of the modules within the trusted execution environment for authentication operations. Thus, in some embodiments, a client execution environment may include an application programming interface (API) by which those requests are communicated from the CEE to the TEE, and responses thereto are communicated from the TEE to the CEE. In some embodiments, the TEE may include an API like that above for facilitating the above communication of data, or may additionally include another API (e.g., in addition to either aforementioned API) or secure operating system for facilitating communication of data between elements within the TEE. Thus, for example, once the trusted execution environment 105 receives a request or other data for processing, that data can be processed exclusively within (or securely by) the TEE (e.g., without revealing secure data to the CEE). The structure of the trusted execution environment 105 may be logical, implemented in hardware, or a mix of both.

Some embodiments of a trusted execution environment 105 may include a TEE co-processor and TEE memory, which may be physically separate from a processor and memory a of a client execution environment (e.g., that executes an operating system or applications 107. 109). In some embodiments, a trusted execution environment 105, with the TEE co-processor, may execute a process to generate or otherwise securely store (e.g., within a secure memory different from memory of client execution environment or by cryptographic isolation) one or more encryption keys, which may include one or more keys from a key-pair, such as a pairing of a private cryptographic key and a public cryptographic key. One or more keys, such as generated private keys or obtained private keys or certificates, may be protected within the trusted execution environment 105, such as within secure memory to prevent access and unauthorized use by applications within the client execution environment. Additionally, different private keys or certificates (e.g., credentials) may be isolated from different trusted applications within the trusted execution environment by cryptographic isolation. In some embodiments, credentials may be encrypted (e.g., for storage) based on a cryptographic key of a hardware component, such as a key of one of the TEE co-processor or component associated with the TEE co-processor, so that the credentials may only be used within the TEE. For example, a process of the TEE co-processor may access an encrypted version of a credential stored within TEE memory and then decrypt the encrypted version of the credential based on a cryptographic key of the hardware component prior to another process utilizing the private key. In this way, a credential may be afforded a substantially similar degree of security as that of a cryptograph key of the hardware component. In other words, a malicious actor must cause the hardware component to divulge a key for decrypting an encrypted version of the credential prior to being able to use the credential (e.g., for a signature or to decrypt data). Similarly, a TEE co-processor may encrypt other data stored within the trusted execution environment 105, either with a generated private key, received key, a cryptographic key of a hardware component, or combination thereof. Likewise, the TEE co-processor may decrypt other data, such by decrypting that data with a generated key, received key (e.g., of a certificate), a cryptographic key of a hardware component, or combination thereof (such as in instances where some data is encrypted using a stored key and that encrypted data stored subsequent to further encryption based on a cryptographic key of a hardware component).

Some embodiments of a trusted execution environment 105 may be used to encrypt different data like different keys or other data associated with different applications or modules based on a function that takes as input a cryptographic key (which may be a generated key, hardware key, or other stored key) and a value that is altered for the different data.

Alternatively, a cryptographic key itself may differ for different data, for example, a function may take as input a cryptographic key of a hardware component and a value that is altered to generate different cryptographic keys for different data. In turn, a function may utilize different cryptographic keys to encrypt different data, such as with respect to different applications or even more granularly (e.g., different accounts for a same application, such as for a personal and work email account accessed by a same email application). The value that is altered may be altered deterministically (an operation referred to as incrementing or decrementing herein, depending on the direction in which alterations occur along a deterministic sequence), selected deterministically, generated randomly, output from a linear shift register, or by other method, and the alteration of the value ensures that one module or application cannot utilize a cryptographic key or stored data encrypted by that cryptographic key to which it is not authorized.

In contrast to a private key of a key pair, a public key of the key pair may be shared outside the trusted execution environment 105, such to the client execution environment (e.g., to applications 107, 109) or other entities, such as other devices or systems via network 121. In some example embodiments, a device 101 may receive a key-pair or private key of a key-pair, such as corresponding to a certificate, like a device certificate, and the private key may be similarly maintained within the trusted execution environment (such as upon receipt by the device). Thus, for example, a private key corresponding to a certificate, certificate, or other data, may be obtained securely, such as by encryption of the data by the entity that generates or supplies the data using a cryptographic key (e.g., a public key of a key-pair, or encryption key) for which the TEE of the device stores a cryptographic key (e.g., a private key of the key-pair, or decryption key) operable to decrypt the encrypted version of the data. For example, elements outside a trusted execution environment may utilize a public key of a key-pair generated by the trusted execution environment 105 to encrypt data, which can then only be decrypted with a private key of the key-pair maintained by the TEE—and this process may be used to securely covey a certificate, private key (or other asymmetric cryptographic key), symmetric cryptographic key, or other data from the CEE or other entity to the TEE. Thus, embodiments of the trusted execution environment 105 may generate (e.g., securely within the TEE) a private key of a key-pair (or other cryptographic key) or obtain (e.g., securely by the TEE) a private key of a key-pair (or other cryptographic key or other data) generated by another entity that may be stored with similar assurance of not being divulged to unauthorized entities. The two approaches have different tradeoffs, the former being secure in that only the trusted execution environment 105 of the device 101 has knowledge/use of the private key, and the latter permitting reissue of a private key to a user, such as on a new device (or ability for a corporate system to otherwise have knowledge/use of the private key).

In some embodiments, a trusted execution environment 105 may sign results or other data output with a signature function that utilizes a private key of a key-pair securely maintained by the TEE, and an element outside the TEE may utilize a disseminated public key of the key-pair to verify the signature, and thus verify that the result or other data output was generated by the TEE. Thus, for example, a trusted execution environment 105 may execute a process to sign some data with a private key, and a disseminated public encryption key can used to verify that the trusted execution environment signed the data. In the context of verification or authentication of a device or user, the data may be a credential, like a certificate or credential value or a cryptographic hash value thereof and representative of a user or device requesting to access online resources. For example, a device may be verified as possessing a given device certificate based on verification of a signature of the certificate (e.g., signed using the private key) using the public key. In practice, a device may provide a verifying device with a certificate and a signature of the certificate, the signature being generated (e.g., using a signature function) based on the certificate (and other data, like a timestamp, identifier, or other data in accordance with a verification scheme) using a private key. In some examples, the device may also provide the verifying device with some or all of the other data (e.g., the timestamp, etc.) not already known (or able to be determined) by the verifying device in accordance with the verification scheme. The verifying device may verify the certificate, which contains a public key, as authentic (e.g., issued by a certificate service trusted by the verifying device) and then verify the signature (e.g., using a signature verification function) based on the certificate (and same other data, like the timestamp, which was signed) using the public key. The signature verification function will return a result indicative of whether the verification succeeds, indicating that device used the private key of the key-pair of which the public key of the certificate is a member to generate the signature, or fails.

Embodiments of device 101 may execute a variety of applications, some examples of which may include native applications like a web browser 107 or identity application 109. Some examples of a web browser 107 may include a web browser included with an operating system of the device or other web browser application obtained on the device 101 for execution (e.g., from an application repository, like an application store). Web browser 107 may be any web browser suitable for accessing online resources, like websites or web applications, over a network 121. Some web browsers 107 may include enhanced security features over others. For example, some web browsers 107 may provide for the recognition of a trusted execution environment 105 of a device 101, such as to request output from the TEE or provide input to the TEE (e.g., via an API), like in support of authentication protocols, although such functionality need not be a requirement. Embodiments of an identity application 109 may similarly be obtained on a device 101. For example, device 101 may obtain identity application 109 for execution from an application repository, like an application store. In other examples, identity application 109 may be pre-installed on the device 101 or otherwise provided to the device. Embodiments of the identity application 109 may interface with the trusted execution environment 105 to request the generation of credentials (or to securely maintain any received credentials or other data) on the device 101, such as various user credentials or device credentials, request output from the TEE, or provide input to the TEE (e.g., via an API).

In some embodiments, manager device 130 may be a device known to corporate systems and resources 110, such as the identity management service 120. Thus, manager device 130 may be an existing personal (or issued) device that is used to access email via a mail server 116, access one or more applications 117 (or APIs thereof), or other data 118 (e.g., files stored on a network drive). In addition, relative to device 101, the manager device 130 may be an existing device that is associated with a different user (e.g., a verifying user, like a manager of the employee that obtained device 101) who is permissioned to verify the identity of one or more users (e.g., employees) using a manager device. For example, manager device 130 may be associated with a given manager to which one or more other employees report, and information about the manager device. In another example, manager device 130 may be associated with a given IT team member that supports one or more other employees (like employees that work in a given office, department, or team). In either case, the verifying user (e.g., manager, IT team member, etc.) to which the manager device 130 belongs may (or preferably will) have first-hand knowledge of the users that the verifying user is permitted to verify.

Examples of manager device 130 may include, but are not limited to a mobile device, like a highly portable smartphone or tablet. Other examples of a manager device 130 may include, but are not limited to, laptop or tablet type personal computing devices. Additionally, a manager device 130 may be a desktop computing device, or any other computing device, that executes an operating system or provides access a virtual machine or virtual desktop associated with the verifying user (thus, in some examples, a manager device 130 may be a virtual machine or a virtual desktop executed by a server of the corporate systems and resources 120 and that is accessed by a client device (not shown) used by the verifying user). Some embodiments of a manager device 130 may thus be similar to those of device 101 while others may be different. Generally, the manager device 130 may be any one of a number of devices utilized by a verifying user depending on the embodiment. Moreover, some embodiments may permit a verifying user to any one of a set of such devices used by the verifying user to access a verification application 131, as the application may be accessible via each device in the set. For example, a verifying user may have access to one or more of their smartphone, tablet, work computer (whether a laptop or desktop), or client for accessing their virtual machine or desktop at the same time.

Embodiments of manager device 130 may execute a variety of applications, some examples of which may include native applications, like a web browser or verification application 131. In some examples, verification application 131 may be a web-based application, such as a web application or website providing functionality corresponding to the verification application and that is accessible via a web browser. In some cases, a verification application 131 may be a browser extension or browser executable application, like a standalone script or executable which may be executed within the runtime environment of a browser. Other examples of a verification application 131 may be a standalone native application, which in some cases may be similar to identity application 109. For example, an identity application 109 may provide additional functionality corresponding to the verification application 131 to verifying users, which is not to suggest that verification application functionality and identity application functionality cannot be provided via discrete applications, or that some functionality many be shared between such applications even when they are different. Thus, a verification application 131 may take on a variety of different forms depending on the embodiment, and those different embodiments of the verification application may be accessed by or obtained by a manager device 130 in different ways consistent with the embodiment. For example, the verification application 131 may be downloaded from an application repository, like an application store, onto a smartphone or tablet executing a mobile operating system, downloaded from an application repository and installed on a laptop or desktop computer or virtual machine executing a desktop operating system, etc. Some example verification applications 131 may provide for the recognition of a trusted execution environment of a manager device 130 when applicable, such as to request output from the TEE or provide input to the TEE (e.g., via an API), like in support of authentication protocols, although such functionality need not be a requirement.

Embodiments of the corporate systems and resources 110 may include a variety of systems, services, and other resources often utilized by corporations and other enterprises. Embodiments may include a variety of different computing devices, like one or more servers, which may be a mix of compute and storage servers. In many cases, corporate systems and resources 110 may be implemented with a distributed architecture, such as in the cloud, geographically distributed compute and storage servers, or a combination thereof with some operations being performed in the cloud and others on private hardware. As shown, example corporate systems and resources 110 may include an identity management service 120 and various resources 115.

In some embodiments, an identity management service 120 includes an enrollment service 111 for supporting the onboarding of devices (e.g., like device 101), stores various records like device records 112 corresponding to managed devices, and a credential service 113 for generating device certificates or otherwise establishing device credentials. In some examples, the different components of the identity management service 120 may be responsive to application programing interface (API) calls or otherwise called to process or return data. Embodiments of the identity management service 120 may provide devices access to functionality via the API in a variety of ways, such as via a website or web application accessible via a browser, application server accessible via a native application), or other suitable means for exposing the API.

In some embodiments, the enrollment service 111 may support one or more protocols by which the manager device 130 can communicate with the new device 101. For example, the enrollment service 111 may support one or more messaging, voice, or video chat protocols by which users of the respective devices can communicate via one or more corresponding interfaces. Some embodiments of the enrollment service 111 may negotiate establishment of a communication session between the manager device 130 and the new device 101, which in some examples may flow through the enrollment service. For example, the manager device 130 and device 101 may respectively submit messages which may be conveyed to the other party in a chat session by the enrollment service 111. The respective parties may view the messages within a text chat interface. In another example, the manger device 130 or device 101 may request a voice or video chat session, such as via an interface element displayed within the text chat interface, and the enrollment service 111 may negotiate an audio or video session between the devices. A user of the management device 130 may access the verification application 131 (e.g., by launching a native application, browsing to webpage or web application, or otherwise using a browser application as described herein) to view a chat interface, request or accept a voice or video session, and provide or view other information. A user of the new device 101 may similarly launch a native application, like the identity application 109, or utilize the web browser 107 to access a website or web application to view a chat interface, request or accept a voice or video session, and provide or view other information.

In some embodiments, device records 112 may include records of devices known to the identity management service 120 (e.g., devices which are permitted to access resources 115). Additionally, a device record 112, or other record which may be associated with or implicate a device record may indicate which user (or users) may verify an identity of another user for onboarding of a device. For example, a device record 112 corresponding to manager device 130 may be associated with a manager, who may be permissioned (e.g., as indicated by a record) to verify an identity of one or more other users for onboarding devices of those other users. Accordingly, when one of those users, such as a user of new device 101 requests to onboard their new device, their manager may be identified as being permissioned to verify the identity of the user based a record. In turn, the manager may be notified, such as on their manager device 130 (or multiple thereof) based on one or more device records 112 associated with the manager. Notifications may take a variety of different forms. A notification may be an email notification or chat notification (e.g., TEAMS, SLACK, or other chat platform) with a link to a webpage or web application, or deep link to an application like verification application 131, push notification to a native application or browser application, or other suitable notification. A device record 112 for a device may be created for a user when that device is successfully enrolled for that user. A device record 112 may be associated with permissions and user information, such as to indicate which resources 115 the device is permitted to access and for what user account. A device records 112 may be removed, or permissions rescinded, to prohibit access to one or more resources 115. In some cases, rules may govern the creation of new device records 112 for a user. For example, a user may be permitted only a certain number of device records corresponding to a given type of device (e.g., one of each of a smartphone, tablet, and laptop computer) or a maximum number overall (e.g., three devices), or other combination. In some examples, when a new device 101 of a given type is enrolled another current device of the same time may be unenrolled (e.g., the record removed or permissions rescinded) responsive to enforcement of applicable rules. Additionally, as explained above, device records 112 may be associated with information about the user of the device, and the user of the device may be permissioned to be a verifying user of one or more other users. For example, a device record associated with a manager device 130 may indicate information about the manager (e.g., like a user account, such as an email account or username) and the information about the manager may be associated with information about other users (e.g., like their names or user accounts), such as via a lookup table, org structure, or other record of users (e.g., employees of a company).

In some embodiments, credential service 113 implements one or more functions for credentialing devices to enrolled for access to resources 115 in an onboarding process. For example, the credential service 113 may generate a certificate issued to a new device in an onboarding process, and that certificate may be stored in association with a device record of the new device (or as a device record, with which other information may be associated). Thus, for example, some embodiments of the credential service 113 may be a certificate service, like a certificate authority, that issues certificates which are trusted by corporate systems and resources 110. In some examples, certificates or information about issued certificates may be stored in association with device records 112. For example, the credential device 113 may issue one or more user or device certificates (the use of which, in some examples, may be co-mingled, or may be interchangeable) which may be asserted by devices to access one or more resources 115 subject to verification.

In some embodiments, resources 115 may include, but are not limited to, mail servers 116, applications 117, and data 118. Mail server 115 may be a corporate email server, such as that used by employees, and accessible via a variety of different devices (e.g., like various ones of examples manager devices 130 and devices 101 described above) using various email clients (e.g., MICROSOFT OUTLOOK, APPLE MAIL, GOOGLE GMAIL, VMWARE BOXER etc.). Applications 117 may include various applications used by employees during the course of their workday which may be hosted or supported by corporate systems, some of which may store or access data 118. Data 118 may include network drives of users, storage used by other resources 115, and other information described herein. In some examples, data 118 may include records of employees which may be accessed by the identity management service 120, such as based on a user account identifier or other information corresponding to an employee, and may further store information about which employees are permitted to verify the identity of other employees (e.g., such based on rules applicable to records of employees or explicitly indicated permissions), which is not to suggest that such information cannot be stored in other records (like device records 112) in association with other systems or services.

In some embodiments, admin device 140 may be a device used by an admin or IT team member to configure or otherwise manage corporate systems and resources 110. Some embodiments of admin device 140 may have a configuration similar to that of some examples of a manager device 130. In some examples, admin device 140 may be a terminal device utilized to manage one or more server systems of the corporate systems and resources 110. In some embodiments, the admin device 140 may be used to manage the various services or records of the identity management service 120, view or manage functions associated with those services, and audit records. The admin device 140 may also be used to manage or configure resources 115 such as the mail server 116, the various applications 117, and data 118. In some examples, data 118 or device records 112 may contain logs, such as logs corresponding to verification of users (e.g., by a verifying user) and other operations performed by the identity management service 120 or other operations of systems and resources.

Figure 2:
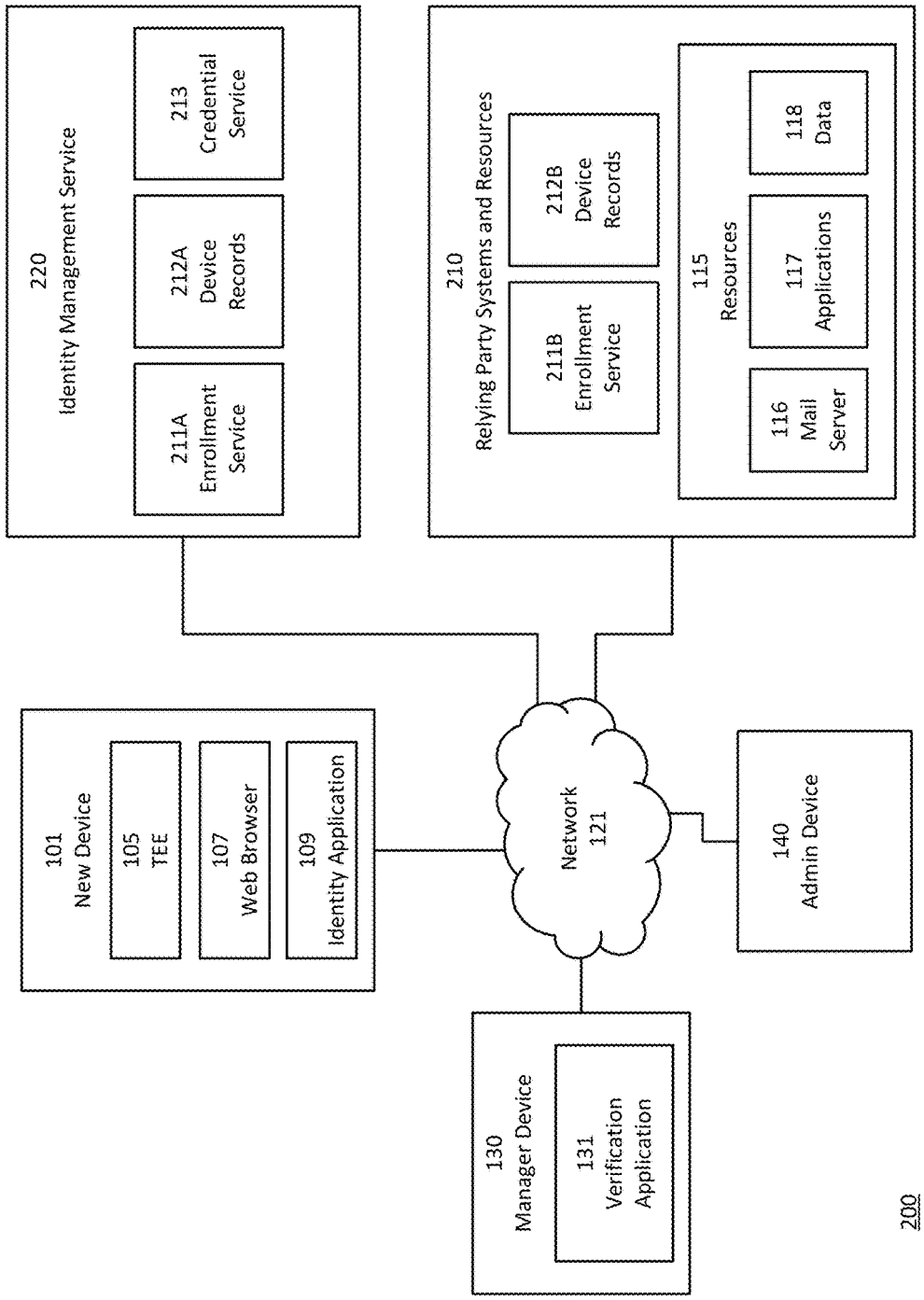
FIG. 2 illustrates another example of a computing environment within which a device enrollment service may be implemented in accordance with the present techniques.

FIG. 2 illustrates another example of a computing environment 200 within which a device enrollment service may be implemented in accordance with the present techniques. In some embodiments, the computing environment 200 may include a device 101, like a new personal device of a user or new device issued to a user, a manager device 130, and an admin device 140, each of which may be devices similar to those like referenced devices described with respect to one or more example embodiments in accordance with FIG. 1. Also shown is identity management service 220 and relying party systems and resources 210. These components may communicate with one another via a network 121, such as the Internet and various other local area networks, which is not to suggest that each entity must communicate with each other entity.

In some embodiments, identity management service 220 may provide identity management services to various relying parties. In some cases, an identity management service 210 may be provided in connection with an authentication service that performs operations to authenticate users and provide authentication results that indicate whether a user was authenticated. The authentication results may be utilized by other parties, such as relying party systems and resources 210 to determine whether a given user should be granted or denied access to resources 115. Those devices may be onboarded to establish one or more credentials by which the device may be identified (e.g., in addition to or instead of one or more user credentials). For example, it may be desirable to gate access to resources 115 to enrolled devices of authorized users. Moreover, onboarding processes that verify the identity of a user in accordance with the present techniques may ensure that onboarded devices are those that belong to authorized users (e.g., employees of a relying party).

In some embodiments, an identity management service 220 includes an enrollment service 211A for supporting the onboarding of devices (e.g., like device 101), stores various records like device records 212 corresponding to managed devices for a relying party, and a credential service 113 for generating device certificates or otherwise establishing device credentials. In some examples, the different components of the identity management service 220 may be responsive to application programing interface (API) calls or otherwise called to process or return data, such as in support of relying party systems 210. Embodiments of the identity management service 220 may provide devices access to functionality via the API in a variety of ways, such as via a website or web application accessible via a browser, application server accessible via a native application), or other suitable means for exposing the API. Additionally, API functionality may be exposed to relying party systems and resources 210, and the relying party systems may also include an API exposed to the identity management service 220, by which relying party systems and identity management service may exchange data.

In some embodiments, the enrollment service 211A may support one or more protocols by which the manager device 130 can communicate with the new device 101. For example, the enrollment service 211A may support one or more messaging, voice, or video chat protocols by which users of the respective devices can communicate via one or more corresponding interfaces. Some embodiments of the enrollment service 211A may negotiate establishment of a communication session (or one or more sessions over various protocols) between the manager device 130 and the new device 101, which in some examples may flow through the enrollment service 211A. In some embodiments, the enrollment services 211A may negotiate the establishment of such communication sessions through an enrollment service 211B (e.g., a relying party-side component) of a relying party system 210 (or vice versa). For example, in some examples, each device may establish a session with a respective enrollment service and the enrollment services 211A, 211B may pass respective session data over a session between the enrollment services. Thus, for example, the manager device 130 and device 101 may respectively submit messages which may be conveyed to the other party in a chat session by one or more of the enrollment services 211A, 211B. The respective parties may view the messages within a text chat interface. In another example, the manger device 130 or device 101 may request a voice or video chat session, such as via an interface element displayed within the text chat interface, and one or more of the enrollment services 211A, 211B may negotiate an audio or video session to convey session data between the devices. A user of the management device 130 may access the verification application 131 (e.g., by launching a native application, browsing to webpage or web application, or otherwise using a browser application as described herein) to view a chat interface, request or accept a voice or video session, and provide or view other information with an enrollment service 211. A user of the new device 101 may similarly launch a native application, like the identity application 109, or utilize the web browser 107 to access a website or web application to view a chat interface, request or accept a voice or video session, and provide or view other information with an enrollment service 211.

In some embodiments, device records 212 may include records of devices known to the identity management service 220 (e.g., devices which are permitted to access resources of relying party systems). In some embodiments, records and other information stored within the device records 212 may be partitioned with respect to different relying parties utilizing the identity management service 220. For example, device records 212A may correspond to records of devices associated with relying party systems and resources 220 and other records of devices (not shown) may correspond to other relying party systems and resources (not shown). In some examples, the identity management service 220 may store some device record information by device records 212A and a relying party system 210 to which those device records correspond may store some other information about the devices or users of the devices. In some examples, a relying party system 210 may retain some or all device record information with device records 212B, and some or all device record information stored within device records 212A may be purged upon confirmation of establishment of the record information within device records 212B of the relying party system.

In some examples, device records 212B may contain additional information, such as associations between device records or other record which may be associated with or implicate a device record to indicate which user (or users) may verify an identity of another user for onboarding of a device. For example, a device record 212B corresponding to manager device 130 may be associated with a manager, who may be permissioned (e.g., as indicated by a record) to verify an identity of one or more other users for onboarding devices of those other users. Accordingly, when one of those users, such as a user of new device 101 requests to onboard their new device, their manager may be identified as being permissioned to verify the identity of the user based a record. In turn, the manager may be notified, such as on their manager device 130 (or multiple thereof) based on one or more device records 212B associated with the manager. Notifications may take a variety of different forms as described herein. A device record 212A for the new device 101 may be created when that device is successfully enrolled for that user. In some examples, that record may be conveyed for the relying party system 210 for storage within device records 212B, and may be associated with permissions and user information, such as to indicate which resources 115 the device is permitted to access and for what user account. Other embodiments may maintain all records of devices within device records 212A, or within device records 212B, and the identity management service 220 and relying party systems 210 may convey information about devices based on device records via API requests.

Examples device records, whether maintained by the identity management service 220, relying party system 210, or a combination of thereof, may be removed, or permissions rescinded, to prohibit access to one or more resources 115. In some cases, rules may govern the creation of new device records 212 for a user. For example, a user may be permitted only a certain number of device records corresponding to a given type of device (e.g., one of each of a smartphone, tablet, and laptop computer) or a maximum number overall (e.g., three devices), or other combination. In some examples, when a new device 101 of a given type is enrolled another current device of the same time may be unenrolled (e.g., the record removed or permissions rescinded) responsive to enforcement of applicable rules. Additionally, as explained above, device records 21 may be associated with information about the user of the device, and the user of the device may be permissioned to be a verifying user of one or more other users. For example, a device record associated with a manager device 130 may indicate information about the manager (e.g., like a user account, such as an email account or username) and the information about the manager may be associated with information about other users (e.g., like their names or user accounts), such as via a lookup table, org structure, or other record of users (e.g., employees of a company).

In some embodiments, credential service 213 implements one or more functions for credentialing devices to enrolled for access to resources 115 in an onboarding process. For example, the credential service 213 may generate a certificate issued to a new device in an onboarding process, and that certificate may be stored in association with a device record of the new device (or as a device record, with which other information may be associated). Thus, for example, some embodiments of the credential service 213 may be a certificate service, like a certificate authority, that issues certificates which are trusted by corporate systems and resources 210. In some examples, certificates or information about issued certificates may be stored in association with device records 212. For example, the credential device 213 may issue one or more user or device certificates (the use of which, in some examples, may be co-mingled, or may be interchangeable) which may be asserted by devices to access one or more resources 115 subject to verification.

Embodiments of the relying party systems and resources 210 may include a variety of systems, services, and other resources often utilized by corporations and other enterprises. Some embodiments of the relying party systems and resources 210 may have a configuration similar to that of corporate systems and resources 110, but rather than providing an identity service are configured to rely on the identity management service 220 for one or more functions. Thus, embodiments may include a variety of different computing devices, like one or more servers, which may be a mix of compute and storage servers. Relying party systems and sources 210 may be implemented with a distributed architecture, such as in the cloud, geographically distributed compute and storage servers, or a combination thereof with some operations being performed in the cloud and others on private hardware. As shown, an example of relying party systems and resources 210 may include one or more relying party-side services 211B or records 212B corresponding to an identity management service 220 and various resources 115. In some embodiments, resources 115 may include, but are not limited to, mail servers 116, applications 117, and data 118 like that described with reference to FIG. 1. Device records 212B or data 118 may include records of employees which may be accessed by the enrollment service 211B (or identity management service 220), such as based on a user account identifier or other information corresponding to an employee, and may further store information about which employees are permitted to verify the identity of other employees (e.g., such based on rules applicable to records of employees or explicitly indicated permissions), which is not to suggest that such information cannot be stored in other records (like device records 212A) in association with other systems or services. Embodiments of the enrollment service 211B may, as described above, be a relying party-side enrollment service 211B component that provides all or some functionality of enrollment service 211A in some examples.

Requesting User Identity Verification Workflow

A user of a new device 101 may be a workforce individual (e.g., employee) who is seeking to gain access to corporate (or relying party) systems and resources because they lost their device and have a new one, a new employee who is enrolling remotely, or other scenario such as recovery or re-enrollment of a prior device.

The user may access a webpage or web application using a web browser 107 or obtain a native application, like an identity application 109, on their new device 101 that corresponds to an identity management service. Example webpages or web applications may be hosted by a server, such as a web or web application server associated with an identity management service 120, 220 (and which may also support some embodiments of verification application 131). Example identity applications 109 may be configured to communicate with a server, like an application server, associated with an identity management service 120, 220 (and which may also support some embodiments of verification application 131). In either case, embodiments of an identity management service may, as described herein, supports communications with the new device 101 (and other devices, like the manager device 130 or admin device) which may occur in a variety of different ways.

Upon accessing a website, web application, browser application or utility, or executing an identity application, which may be referred to collectively herein as "application," the user of the new device 101 may be presented with an interface with which the user engages to communicate with the identity management service. For example, the user may provide some initial information by which requests may be filtered, such as information corresponding to their device, identity, or user account. As an example, a user may input one or more of their work email address, username, username and password, employee ID, personal telephone number on file, address on file, social security number (or portion thereof), name of manager, or other combination of information by which enrollment requests may be initially filtered. In the context of other identity verification use cases, some other applicable factors may include, but are not limited to, credit card number (or portion thereof), account number (or portion thereof), a record identifier (e.g., like a case number or reference number), personal email, information corresponding to the identity verifier, or the like.

Figure 3D:
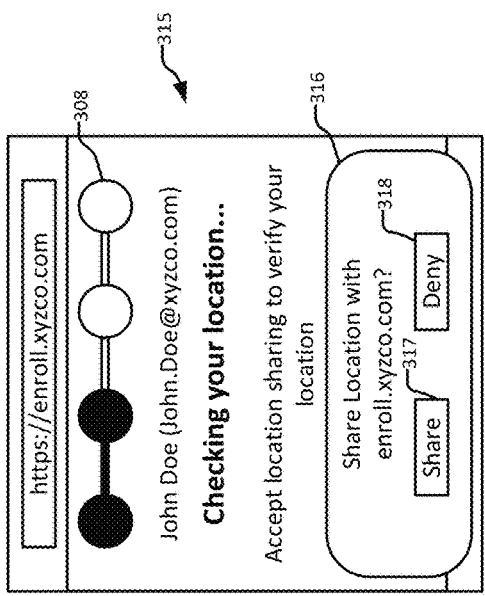
Figure 3C:
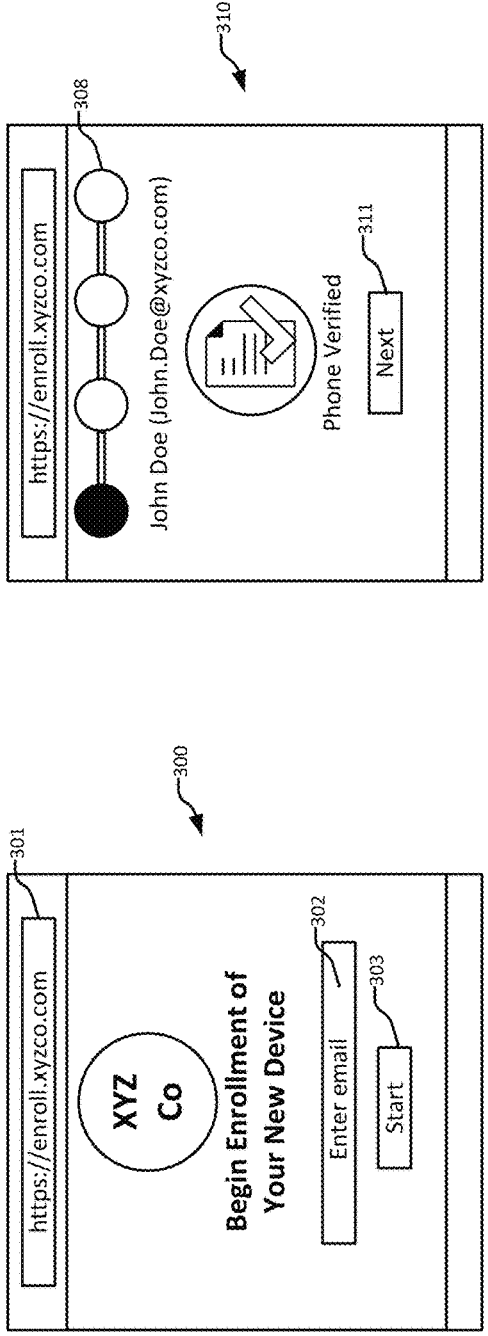
Figure 3B:
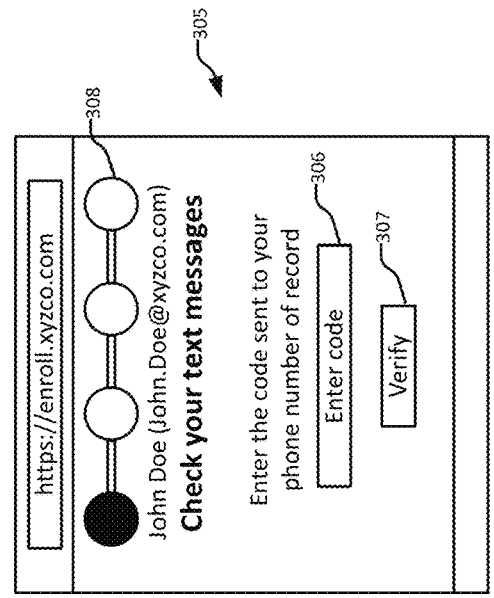
Figure 3A:
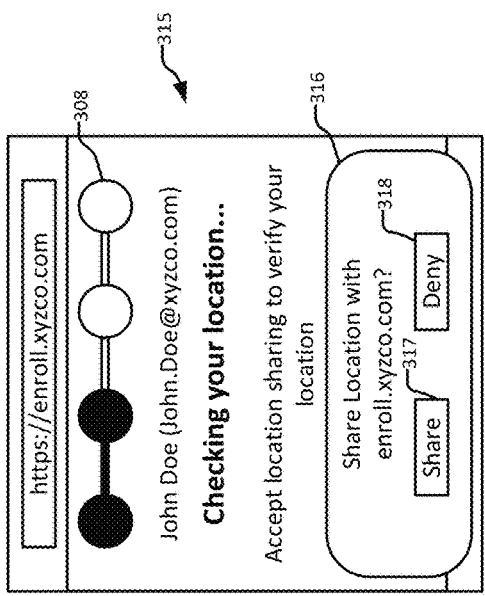

FIG. 3A illustrates an example interface 300 of an application for enrollment of a new device, subject to identity verification, in accordance with some example embodiments. In the illustrated example, a user may browse to a website like "https://enroll.xyzco.com" 301 to access a web interface 300 of the application. In other examples, such as those using a native identity application, an interface 300 may omit such information. One or more input fields 302 may be provided to supply initial information, like an email address (e.g., John.Doe@xyzco.com), by which requests may be filtered. After providing the requested input, the user may select a user interface element 303 to submit the request and start identity verification.

The provided input may be verified by the identity management service against device records or other data record sources of users (or expected users) to determine whether to process the request. For example, the combination of inputs may be checked against record information to determine whether the combination of inputs matches information corresponding to a given user (e.g., employee, or other user of the service). Some embodiments may request input for filtering requests which remains relatively static for users and which users commonly know or use but which a nefariously party is unlikely to know about the user in combination, such as to reduce friction for legitimate identity verification attempts (e.g., for device enrollment). One example combination may be a work email address, personal telephone number, and employee ID. In the context of relying party configurations, input like a work email address or other relying entity specific information may also serve to identify to an identity management service which relying party the device enrollment (or identity verification) request corresponds (e.g., such that the identity management service may access corresponding records or request verification of input data not maintained by the identity management service from the corresponding relying party system).

With respect to device enrollments, record information may further indicate whether a user is permitted to enroll a device, or whether the employee is permitted to enroll a new device dependent on device type or other factors (e.g., replacement of enrollment of an existing device with the new device). For example, the user may be prompted to indicate whether the new device 101 is intended to replace an existing device of a given device type upon completion of enrollment, such as based on a maximum permissible number of devices of the given device type permitted to be enrolled for the user.

The identity management service may thus determine whether to filter the request based on the initial information and obtained record information (or indication of verification some or all of initial input from corporate or relying party system records or data). Additionally, any conditional enrollment criteria may be identified, such as whether the user must elect an existing device to unenroll prior to enrollment of the new device during the onboarding process.

After initial request filtering, the identity management service may cause the user to be prompted by the application to complete one or more device-identification check streams. The data obtained therefrom by the identify management service may be compared against record information and other risk factors. For example, the user may be requested to confirm receipt of a text message (such as on a short messaging compatible service) sent to a personal or work mobile phone number identified from record information corresponding to the user. The text massage may include one or more of a code, a deep link, or optical code (like a QR code, which may encode a code, deep link, or other information). Confirmation of the SMS message may occur in a variety of ways. For example, the user may be requested to input or scan an optical code that was received, access the deep link (e.g., to an identity application, website, or web application) to obtain a code, or a combination thereof.

FIG. 3B illustrates an example interface 305 of an application for enrollment of a new device, subject to identity verification, in accordance with some example embodiments. After inputting information for initial filtering, like an email, if the information matches a user (e.g., John Doe) the user may be requested to complete one or more device-identification check streams. For example, the identity management service may perform a device identification check by generating a text message and code accessible in or based on the text message that is sent to a mobile telephone number on file associated with the matching user from the initial filtering. The new device, or an existing device, may receive the text message, which may contain, link to, or otherwise instruct the user how to obtain a code to be provided as input 306 within the interface 305. After input of the code, which may be manual input, scanning of a value of the code, etc., the user may select a user interface element 307 to request verification of the code. Additionally, as shown, the interface 305 may visually depict a progress bar 308 that is updated throughout the process to indicate state of completion.

In some embodiments, such as where the new device on which approval is being requested differs from a mobile device to which a text message is sent, one or more steps of the process may also be completed on that device in instances where a link or deep link is provided in the text message for obtaining the code. For example, to obtain the code, the user may be required to share a location on the device which received the text message, and that location may be compared to a location obtained from the requesting device to determine whether they are consistent.

FIG. 3C illustrates an example interface 310 of an application for enrollment of a new device, subject to identity verification, in accordance with some example embodiments. After requesting verification of the code 307, the user may be informed as to the result (e.g., success or failure). If the identity management service successfully verifies the received code against the generated code send to the mobile phone number, the user interface 310 may include a user interface element 311 to proceed with the process.

Another example device-identification check stream may be a location check. For example, a user may be requested to allow location service information sharing with the application (or website), the location being shared with the identity management service. The location service information sharing may include the sharing of a location of the device as determined by one or more of global positioning system (GPS), cellular tower, and internet protocol (IP) based location services of the device. Some locations, such as certain countries, or locations other than where the user resides or works may be deemed higher risk than where the user is expected to be located (or may indicate that a nefarious party is attempting to gain access).

FIG. 3D illustrates an example interface 315 of an application for enrollment of a new device, subject to identity verification, in accordance with some example embodiments. The identity management service may cause the user to be prompted 316 to permit 317 (or deny 318) location sharing. Electing to deny 318 location sharing may terminate the process in some embodiments. Upon selection of share to permit 317 location sharing (e.g., with the identity management service website or application for conveyance to the identity management service), the new device may remit information about location determined from GPS, cellular tower (e.g., for wireless telephone network capable devices) or IP-based location services available to the device.

The identity management service may determine whether to verify the location information, such as based on whether the sources indicate a similar location, and different locations may be associated with different risk factors. Degree of similarity may also be associated with a risk factor in some cases, such as whether the location information sources each resolve to a same or nearby cities, state (or province or region), or country. Where locations are reported in different countries may be deemed high risk relative to when locations are reported in a same or nearby cities. One or more rules may govern whether the location is deemed verified, such as according to degree of mismatch or where a location is reported in a risky area, or combination thereof.

FIG. 3E illustrates an example interface 320 of an application for enrollment of a new device, subject to identity verification, in accordance with some example embodiments. After verification of the location information, the user may be informed as to the result 321 (e.g., success or failure). If the identity management service deems the received location information verified, the user interface 320 may include a user interface element 322 to proceed with the process and the progress bar 308 may be updated.

The identity management service may identity a verifying user authorized to verify the identity of the user (i.e., John Doe) matching the initial requesting information. For example, record information may indicate that a manager (e.g., Jane Doe) is permitted to verify the identity of John Doe. The identity management server may obtain device (or user account) information corresponding to Jane Doe, such as by which Jane Doe may be notified by the identity management service as to an identity verification request corresponding to John Doe and the purpose of the request, such as device enrollment in the present example. Other embodiments may indicate other purposes for other use cases, such as identity verification for wire transfer, opening a credit card account, applying for a loan, etc. In either case, the verifying user (e.g., Jane Done) may receive a notification via application push notification, messaging service, email, etc., by which (or which may provide instructions) the verifying user is directed to access a verifying application to verify the identity of the requesting user (e.g., John Doe).

In some embodiments, the identity management service may generate such a notification in response to completion of one or more of the preceding steps, such as to mitigate delay for connecting the requesting user with the verifying user. For example, the verifying user may be notified after the initial filtering information is verified, in some cases with an initial notification, such that the verifying user may have time to access the verifying application prior to the user electing to proceed to connect the with verifying user for identity verification (e.g., by selection of user interface element 322 in FIG. 3E). In some examples, the verifying user may be notified (initially or additionally) upon the requesting user election of user interface element 322 or otherwise proceeding to request to connect with the verifying user. The requesting user may be updated by the identity management service as to the establishment of a connection with the verifying user (e.g., a waiting screen, which in some examples may indicate a status of the verifying user such as whether the verifying user is determined be online or logged in on a device, application, or website for verifying an identity).

FIG. 3F illustrates an example interface 325 of an application for enrollment of a new device, subject to identity verification, in accordance with some example embodiments. In some embodiments, interface 325 may update the requesting user as to the status of connecting with the verifying user. For example, the interface 325 may indicate that the identity management service is waiting for the verifying user to join a conversation (e.g., chat) with the requesting user and update a progress bar 308 indicative of progress through the identity verification process.

In response to the verifying user acting on a notification, such as by accessing a website, web application, or native application, which may collectively be referred to herein as a verifying application, that corresponds to the identity management service for verifying the identity of users, the identity management service may initialize a chat session. The requesting user, via their new device, and the verifying user, via their manager device, may communicate via respective interfaces corresponding to the chat session established by the identity management server. Embodiments of a chat session may support various types of communication or facilitate the request of other sessions embedded within or which may be established in parallel with the chat session.

FIG. 3G illustrates an example interface 330 of an application for enrollment of a new device, subject to identity verification, in accordance with some example embodiments. In some embodiments, interface 330 may correspond to a text-based chat interface with the option to input text for a message within a text input field 331 and user interface element 332 to send the message. Thus, for example, the requesting user (e.g., John Doe) and verifying user (e.g., Jane Doe) may communicate via the exchange of messages over the chat session. The requesting user may explain the reason for the request or convey other information and the verifying user may respond to or request information from the requesting user. Embodiments of the chat interface 330 may further provide user interface elements by which a user may upload an image or other attachment 333 within the chat session or elect to request a voice or video chat session 334.

FIG. 3H illustrates an example interface 335 of an application for enrollment of a new device, subject to identity verification, in accordance with some example embodiments. In some embodiments, interface 335 may correspond to a text-based chat interface after sending of an attachment 336 by the requesting user, such as after being prompted by the verifying user to use the attachment input 333 to upload the attachment. For example, the verifying user may request the requesting user to upload an image of an ID card or badge. In some embodiments, EXIF data may be communicated in association with an image, file, or other attachment and displayed in connection with the attachment, such as to indicate the date and location of creation or other information by which the verifying user may judge the authenticity. In some examples, the requesting user may be prompted to collect an image for upload to the chat interface rather than selection of an existing file, such as to indicate current possession of the item depicted within the attachment.

Figure 3K:
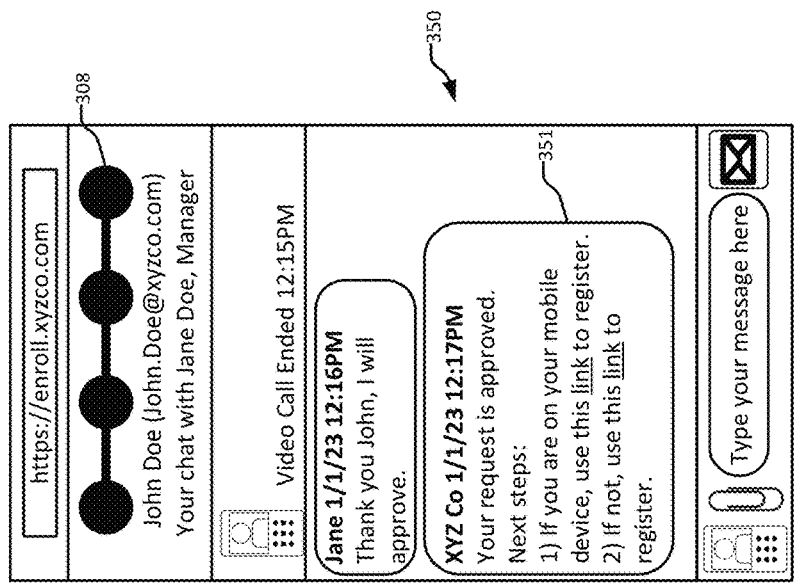
Figure 3J:
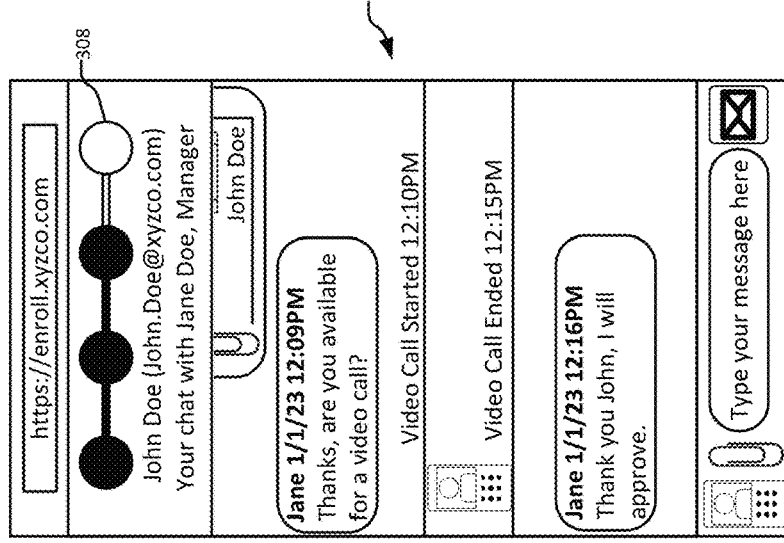
Figure 3I:
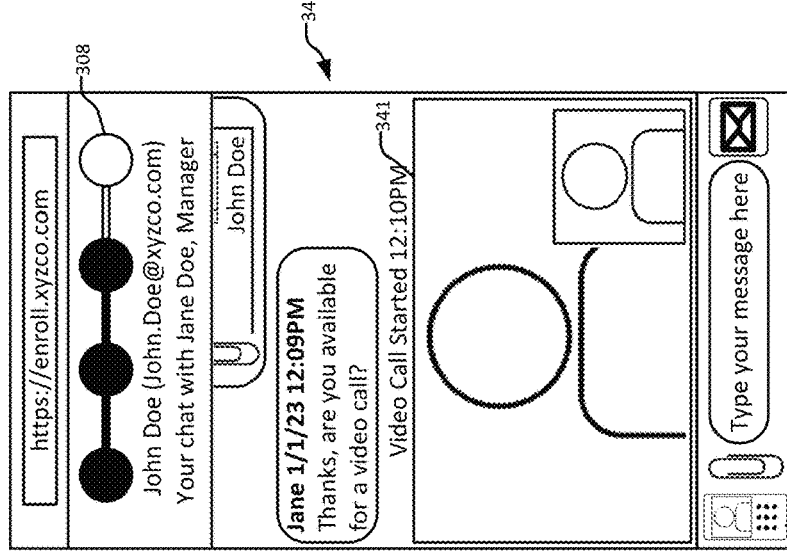

FIG. 3I illustrates an example interface 340 of an application for enrollment of a new device, subject to identity verification, in accordance with some example embodiments. In some embodiments, interface 340 may correspond to a text-based chat interface with an embedded video chat session, such as after selection of a video chat session request 334 by one of the users and acceptance of the video chat request by the other user. For example, the verifying user may request the requesting user to initiate a video chat session by selection of the corresponding user interface element 334 and the verifying user may accept the video chat session to engage in the video chat with the requesting user. The identity management service may establish the video chat session 341, which in some cases may be negotiated between the new device and manager device within the chat session or may be established in parallel and displayed within or coincident with the chat interface (e.g., via an embedded element). In either case, the requesting user and the verifying user may communicate via audio and video, the video being displayed within the video chat session viewer 341. In some cases, a device may support audio but not video, or accept an audio but not a video chat, and one or both users may thus communicate via audio only.

FIG. 3J illustrates an example interface 345 of an application for enrollment of a new device, subject to identity verification, in accordance with some example embodiments. In some embodiments, interface 345 may correspond to a text-based chat interface after completion of a video chat session, such as after a second selection of a video chat session request 334 performed during a video chat session by one of the users. The requesting user and verifying user may further communicate as desired via the chat session. For example, the verifying user may submit a message indicative of their confidence in the identity of the requesting user, and intent to perform one or more actions on the verifying application side to attest to the identity of the requesting user (e.g., attestation that the indicated requesting user, John Doe, is the person with the supplied ID card and with whom the verifying user engaged with in the video (or audio) chat).

FIG. 3K illustrates an example interface 350 of an application for enrollment of a new device, subject to identity verification, in accordance with some example embodiments. In some embodiments, interface 350 may correspond to a text-based chat interface after attestation to the identity of the requesting user by the verifying user. In response to receiving an attestation by the verifying user, the identity management service may generate a link, which may be a deep link (e.g., into a native application, website, or web application), by which the requesting user may complete device enrollment. The identity management service may generate a system message 351 sent to the new device of the requesting user via the chat interface which may contain instructions along with one or more links and instructions corresponding to the links. For example, one link may correspond to a link or deep link to or for a native application executable by a mobile device. Another link may correspond to a link or deep link to or for a website or web application accessible by other computing devices (e.g., like a laptop or desktop). In some examples, a code, like an access code may be provided and which may be supplied by the user via the device or another device to the identity management service or other system (e.g., like of a relying party) to establish credentials or otherwise gain access to a system or resources.

In some embodiments, a link directs the requesting device to a session with a credential service 113, 213, either via a website, web application, or native application, for the establishment of a device record and device credentials. In other examples, the device (or another device) may access an interface by which a code may be provided. The new device may generate (or receive) a key-pair including a public and private key, and a certificate may be issued by the credential service based on the public key to establish credentials during the session. The certificate and public key may be stored by the identity management service in association with or used to establish a device record corresponding to the new device. In some examples, the user may be directed to establish one or more user credentials on their new device, such as for governing access to the private key corresponding to the public key of the certificate. In some cases, representations (like a cryptographic hash) of those credentials may be conveyed to the identity management service, such as for verification in authentication operations that the user authenticated on the device according to one or more of those credentials prior being granted accesses to the private key. The identity management service may also transmit configuration information or other requirements to the device for enrollment. In some examples, configuration information may include server or account information by which one or more resources 115 may be accessed by the device. In some examples, requirements may include data policies or credential strength requirements or limitations or other policy for governance of the device. In some embodiments, private key values and user credentials (e.g., biometric, password, pin, etc.) established during the session may be stored within TEE memory and thus afforded a high degree of security on the device of the user that was verified as being in possession of the device. Accordingly, a high degree of assurance is established for permitting the device to access resources 115 under the identity of the user.

In some examples, the device may be directed to complete some other workflow, such as in other example use cases. For example, the device may be directed to load a document for digital signature using the private key associated with the certificate, establishment of an account responsive to verification of a digital signature, or other activity using the credentials established responsive to verification of the identity of the user of the device. In turn, the completion of that activity by the user of the device may be authenticated based on information included in the device record with a high degree of assurance that the asserted identity of the user that completed the activity is accurate by virtue of the attestation to that identity by the verifying user.

User Identity Verification Workflow

A verifying user may access a verification application 131 that corresponds to an identity management service on their manager device 130, such as in response to receiving a notification of a request for verifying the identity of a user. Example verification applications 131 may be native applications, websites or web-based applications, among other examples described herein. Example webpages or web applications may be hosted by a server, such as a web or web application server associated with an identity management service 120, 220, and example native applications may be configured to communicate with a server, like an application server, associated with an identity management service 120, 220. In either case, embodiments of an identity management service may, as described herein, supports communications with the management device 130 which may occur in a variety of different ways.

Upon accessing a website, web application, browser application or utility, or executing a native application, which may be referred to collectively herein as "verification application," the user of the manager device 130 may be authenticated (e.g., upon their established credentials while using the manager device known to the identity management service) and presented with an interface with which the verifying user engages to communicate with the identity management service. For example, the verifying user may be presented with initial information corresponding to a request, such as an asserted identity of the requesting user (e.g., based on their initial provided identity information and the purpose of the request). Thus, the verifying user may make a determination whether to proceed with verifying the requesting user. In some examples, such information may be included with a notification by which the verifying user may elect to act on or ignore the notification.

FIG. 4A illustrates an example interface 400 of an application for approving enrollment of a new device, subject to identity verification, in accordance with some example embodiments. In the illustrated example, a verifying user may browse to a website like "https://attest.xyzco.com" 401 to access a web interface 400 of the application. In other examples, such as those using a native identity application, an interface 400 may omit such information. One or more informational items 402 may be provided to supply initial information, like an asserted identity or email address (e.g., John.Doe@xyzco.com) of the requesting user and reason for the request. After reviewing the informational items 402, the verifying user may select a user interface element 403 to start identity verification for the requesting user.

FIG. 4B illustrates an example interface 405 of an application for approving enrollment of a new device, subject to identity verification, in accordance with some example embodiments. The verifying user may review various items of information corresponding to a requesting user and the device of the user. For example, information determined by the identity management service responsive to phone verification 406 by the device of the requesting user, like a mobile number, method verified, carrier information, and provider name data may be displayed. Location information 407, 408 may also be displayed for review. For example, reported GPS-based location 407 information reported by the device as obtained by the identity management service may be displayed. Additionally, reported (or determined) IP-based location 408 information obtained by the identity management service may be displayed. In some examples, a risk factor or indication of risk may be displayed, which may be a highlighting or flagging of discrepancies according to verification rules or determination of a risk value (not shown) which may be displayed within the interface 405. Some of the information may be obtained based on that supplied by the user, such as record information 409 corresponding to the user that was identified based on initially supplied information by the requesting user. For example, employee record information (or customer or case information in other example use cases) may be displayed, which may include pertinent location, phone number, ID card or employee number, or other information. Accordingly, a verifying user may review and compare the different information sources, such as to determine whether location information is consistent with the user being in or near their home city, state, or country. A progress bar 410 may indicate the progress of the verifying user through the verification process. The verifying user may elect to select a user interface element 411 to join a chat session with the requesting user to continue the verification process.

FIG. 4C illustrates an example interface 415 of an application for approving enrollment of a new device, subject to identity verification, in accordance with some example embodiments. In some embodiments, interface 415 may correspond to a text-based chat interface with the option to input text for a message within a text input field 416 and user interface element 417 to send the message. Thus, for example, the verifying user (e.g., Jane Doe) and requesting user (e.g., John Doe) may communicate via the exchange of messages over the chat session. The requesting user may explain the reason for the request or convey other information and the verifying user may respond to or request information from the requesting user. For as shown, the requesting user may indicate they obtained a new device and the verifying user may indicate they are willing to verify the identity of the requesting user in an onboarding process for enrolling the device. Embodiments of the chat interface 415 may further provide user interface elements by which a user may upload an image or other attachment 418 within the chat session or elect to request a voice or video chat session 419, and indicate a progress through the process for the verifying user through the progress bar 408.

FIG. 4D illustrates an example interface 420 of an application for approving enrollment of a new device, subject to identity verification, in accordance with some example embodiments. In some embodiments, interface 420 may correspond to a text-based chat interface after receiving of an attachment 421 from the requesting user. For example, the verifying user may prompt the requesting user to upload a picture of their ID to the chat as an attachment 418. The verifying user may view the uploaded attachment 421, such as by selection of the attachment to view the contents or view the contents in greater detail. In some embodiments, EXIF data may be communicated in association with an image, file, or other attachment and displayed in connection with the attachment, such as to indicate the date and location of creation or other information by which the verifying user may judge the authenticity. In some examples, the method of capture and timestamp of capture of the image may be indicated to the verifying user. In some examples, the requesting user may be prompted to collect an image for upload to the chat interface rather than selection of an existing file, such as to indicate current possession of the item depicted within the attachment, and the verifying user may be notified via the chat interface whether the user provided the attachment in the prompted manner. In some examples, the identity management service may process attachments to determine any inconsistences in lighting, properties, or text to determine whether they were digitally modified. A result of the processing (e.g., pass/fail) may be indicated to the verifying user.

FIG. 4E illustrates an example interface 425 of an application for approving enrollment of a new device, subject to identity verification, in accordance with some example embodiments. In some embodiments, interface 425 may correspond to a text-based chat interface with an embedded video chat session, such as after selection of a video chat session request 419 by one of the users and acceptance of the video chat request by the other user. For example, the verifying user may request the requesting user to initiate a video chat session by selection of the corresponding user interface element 419 and the verifying user may accept the video chat session to engage in the video chat with the requesting user. The identity management service may establish the video chat session 426, which in some cases may be negotiated between the new device and manager device within the chat session or may be established in parallel and displayed within or coincident with the chat interface (e.g., via an embedded element). In either case, the requesting user and the verifying user may communicate via audio and video, the video being displayed within the video chat session viewer 426. In some cases, a device may support audio but not video, or accept an audio but not a video chat, and one or both users may thus communicate via audio only. In some embodiments, the verifying user may capture one or more images from the video chat, such as by selection of a capture icon (not shown) for auditing or image processing. In some embodiments, the identify verification service may collect one or more captures corresponding to a video chat session for auditing, which may be optionally processed as described below.

FIG. 4F illustrates an example interface 430 of an application for approving enrollment of a new device, subject to identity verification, in accordance with some example embodiments. In some embodiments, interface 430 may correspond to a text-based chat interface after completion of one or more verification tasks. For example, after a video (or audio) chat session concludes and after upload of at least one attachment by the requesting user, a user interface element 431 for the verifying user to attest to the identity of the requesting user may be selected. In some examples, the text-based chat interface 430 may be updated to include the user interface element 431 for attestation only after one or more verifying tasks are completed by the requesting user (or verifying user). For example, some example embodiment may require engagement in an audio or video chat session and one or more uploads from the requesting user to be completed. The identity management service may determine to update the interface to make selectable or provide for selection the attestation user interface element 431 to the verifying user only after detection of completion of the required verifying tasks. In some examples, the identity management service may process attachments (e.g., via image or text recognition processes) and audio or video data (e.g., via text to speech followed by natural language processing of the text, image or facial recognition, etc.) to determine whether to make the attestation user interface element selectable. The requesting user and verifying user may further communicate as desired (or required) via the chat session in accordance with previously described techniques as may be required by the identity management system or the verifying user to confidently attest to the identity of the requesting user.

FIG. 4G illustrates an example interface 435 of an application for approving enrollment of a new device, subject to identity verification, in accordance with some example embodiments. In some embodiments, interface 435 may correspond to a review interface of the information determined or collected corresponding to the request. For example, expandable menus may include information corresponding to phone and location data 406-408 and user record information 409 previously displayed to the verifying user, which the verifying user may elect to review after the chat session and prior to confirming attestation. Additionally, in some embodiments, expandable menus corresponding to attachments 436 uploaded to the change and any video captures 437 from a video chat may be provided for review. Thus, for example, the verifying user view review photo ID, user record photo, and video capture image to confirm agreement of the identity of the requesting user. The verifying user may also, in some examples, return to the chat to verify or request additional information. After optional (or required) review of the information, the verifying user may select a user interface element to approve 438 or deny 439 the identity verification request, such as for enrollment of a new device for the requesting user.

FIG. 4H illustrates an example interface 440 of an application for approving enrollment of a new device, subject to identity verification, in accordance with some example embodiments. In some embodiments, interface 440 may correspond to a confirmation interface after election to approve 438, confirming intent of the verifying user to attest to the identity of the requesting user and approval of the request (e.g., to enroll a device in an onboarding process). In some embodiments, a comments field 441 may be provided for the verifying user to provide any comments or additional information as to their reasoning for conformation 443 of approval of the request by selection of the corresponding user interface element. Alternatively, the verifying user may elect not to confirm 442 by selection of the corresponding interface element.

FIG. 4I illustrates an example interface 445 of an application for approving enrollment of a new device, subject to identity verification, in accordance with some example embodiments. In some embodiments, interface 445 may correspond to a results interface after confirmation of request approval. For example, a review approval log 446 (which may contain information like that described with respect to elements 406-409, 436 and 437, among other data, like chat logs etc.) may be provided for additional review via expandable menu. Interface 445 may also indicate information 447 about a link or code and status or use of the link or code by a device. In some examples, a user interface element 448 may be provided by which the verifying user may resend a link or code to the device (e.g., prior to or after expiration, within a certain threshold time).

Figure 5:
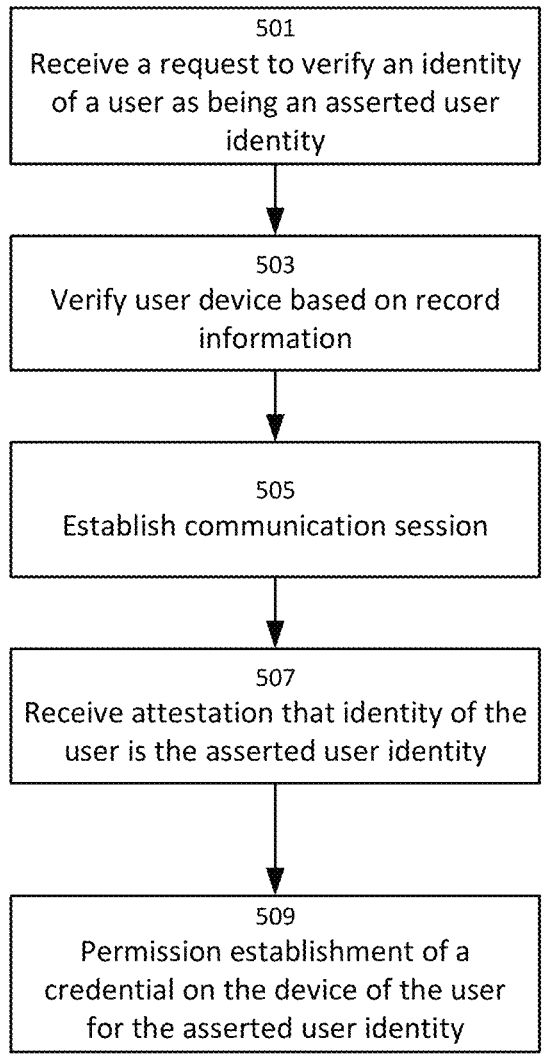
FIG. 5 illustrates an example flow-chart of a process for identity verification of a user in accordance with the present techniques.

FIG. 5 illustrates an example flow-chart of a process 500 for identity verification of a user in accordance with the present techniques. Embodiments of the example process 500 may be performed by a computing device, such as a computing device (or devices) implementing an identity management service in accordance with the techniques described herein.

In some embodiments, the process includes receiving 501 a request, to verify an identity of a user, from a device (e.g., of the user). For example, the user may submit a request to verify their identity as that of an asserted user identity. The user may provide information corresponding to the asserted user identity, such as by providing an initial identifier, like a user identifier, by which a record associated with the asserted user identity is identifiable. An identity management service may, for example, store or request access to records that comprise information about one or more of users, user accounts, and devices. The request, or information obtained in association with the request from the user device may contain information (e.g., like an identifier) corresponding to an asserted user identity, such as one or more of an email address, employee ID, username, etc., or other record identifier (such as an account number, driver license number, credit card number, etc.) by which one or more records or information therefrom associated with the asserted user identity may be identified or obtained by the identity management service.

In some embodiments, the process includes verifying 503 the user device based on record information. Embodiments of the process may obtain one or more device verification values from the device of the user, such as based on record information associated with the asserted user identity. For example, obtained record information may comprise a telephone number associated with the asserted user identity to which a code may be transmitted. In other examples, a code may be transmitted to another account accessible by the user that corresponds to the asserted user identity, like an email address to which a user of the asserted user identity can access with the device (or another device). In some examples, a link to a code may be transmitted, and the link must be accessed by the device (or another device) to obtain to the code. After the user (or device of the user) obtains the code, the identity management service may receive the code from the device of the user as a device verification value (e.g., like a $2^{nd}$ factor authentication corresponding to the asserted user identity). In another example, a location of the device of the user may be obtained or determined. For example, the identity management service may request that the user of the device cause (e.g., permit) the device to share device location data, like GPS, wireless carrier, or IP-location based location data with the identity management service. Some embodiments of the process may reject requests based on location criteria, such as if the reported location values (e.g., IP-based vs GPS-based) exceed a threshold amount. Some embodiments of the process may determine whether one or more of the determined location values match (e.g., within a same city, state, country, region, threshold distance, etc.) with a location of the user as indicated by user record information. Some embodiments of the process may reject a request (or flag corresponding information)

Additionally, embodiments of the process may obtain, based on the record associated with the asserted user identity, verifying device information corresponding to a verifying user having permissions to attest to the identity of the user. For example, a record of the verifying user or verifying device may be associated with or indicated in record information corresponding to the asserted user identity, and the verifying user may be indicated as having permissions to attest to the identity of the user. In turn, a notification indicative of a pending identity verification request corresponding to the asserter user identity may be issued to the verifying user (e.g., a user account associated with the verifying user) or verifying device of a verifying user.

In some embodiments, the process includes establishing 505 a communication session between the device of the user and the verifying device of the verifying user. For example, the verifying user via the verifying device may act on the notification and receive for review information about (or verification of) the at least two device verification values corresponding to the device of the user and information corresponding to the asserted user identity. In some examples, the verifying user may view user record information corresponding to the asserted user identity, like name, picture, home or work location, etc. In turn, the identity management server may receive from the verifying device a selection to establish a communication session with the device of the user (e.g., if the verifying user believes the user of the device may reasonably correspond to the asserted user identity). For example, embodiments of the process may establish a chat session between the verifying device and the device of the user. Within the chat session, the users may communicate in a variety of different ways, such as via text communication, uploading attachments, or audio or video communication session. In some examples, the identity verification server may detect whether requested identity confirmation options are performed over the communication session. For example, the identity management service may detect the uploading of an attachment from the device of the user, like an identification document, or the participation of the user and verifying user in a video or audio communication session between the verifying device and the device of the user.

In some embodiments, the identity management service may analyze one or more of text, attachments (e.g., images), audio, or video content associated with the communication session. For example, an attachment may be analyzed to determine whether it is a photo identification card corresponding to the asserted user identity. Information detected within an image, like alphanumerical strings, such as those corresponding to a name, identification number (e.g., employee ID, driver's license number, or other identification number), etc. may be extracted (e.g., using optical character recognition) from the image for comparison with one or more like field values associated with the asserted user identity (e.g., based on record information). In some examples, the results of the comparisons may be displayed to the verifying user (e.g., to indicate discrepancies), or a request may be rejected if one or more matching criteria are not met (e.g., employee ID and name from an employee identification card).

In some embodiments, the process includes receiving 507 a selection performed by the verifying user on the verifying device to attest to the identity of the user as being the asserted user identity. For example, after performing one or more requested identification operations to ascertain the identity of the user is that of the asserted user identity, the verifying user may elect to attest to verifying that determination. In some examples, the verifying user may be presented with an interface summarizing the results on one or more determinations or analyses like those described above or elsewhere herein for review and verification for approval.

In some embodiments, the process includes permissioning 509 establishment of a credential on the device of the user for the asserted user identity, such as based on confirmation of the selection by the verifying user on the verifying device for attesting to the identity of the user as that of the asserted user identity. For example, the device of the user (who has been attested to as matching the asserted user identity) may be transmitted a link or code which may be selected on the device by the user to cause the device to interface with the identity management service (or an authentication service) to establish credentials corresponding to the device or the user of the device (e.g., on the device) and transmit information about those credentials (e.g., like a public key, representations of user credentials, etc.) to the identity management service. In turn, the device and user may be authenticated by the identity management service or an authentication service for access to resources based on those credentials. Establishment of credentials may include the establishment of one or more device and user credentials. For example, user credentials (e.g., user biometric, password, pin, etc.) may be established on the device to prevent unauthorized access or use of device credentials (e.g., a private key for cryptographically signing data). Some examples may enforce establishment of user credentials in accordance with a data policy, such as to ensure that minimum criteria is met by the user credentials for gating access of the private key.

In some embodiments, a credential service of the identity management service may issue a certificate corresponding to the public key to the device, where the device retains (e.g., in a secure memory) the private key corresponding to the certificate. For example, the device may generate a public-private key-pair and retain the private key while the public key may be transmitted to the identity management service. In some examples, the identity management service may issue a device certificate to the device based on the public key. In other examples, the identity management service may use the public key to verify information (e.g., cryptographic signatures) generated by the device without issuing a device certificate. In either case, the public key may be used to verify that the user of the device has access to the private key in authentication operations (e.g., for authentication of the user).

In some embodiments, such as when the request is made through an application associated with the identity service, the link (or other interface element provided for user selection after verification) may cause the application to register with the identity management service, and the registration process may include generation of one or more credential values, like a public-private key-pair. In some embodiments, such as when the request is made through a web browser or web application, the link may be a deep link that links into an application through an application store, which may be prompt the user to download the application, and the application when launched may proceed with a registration process. In some embodiments, a link or deep link selected in a web browser may direct the device to access a secure web application or portal hosted by a server to establish one or more credentials, such as to obtain a device certificate or other device configuration information by which the device may access resources. Established credentials, like one or more of private keys, certificates, and user credentials may be stored securely on the device, such as by utilization of a trusted execution environment of the device.

Figure 6:
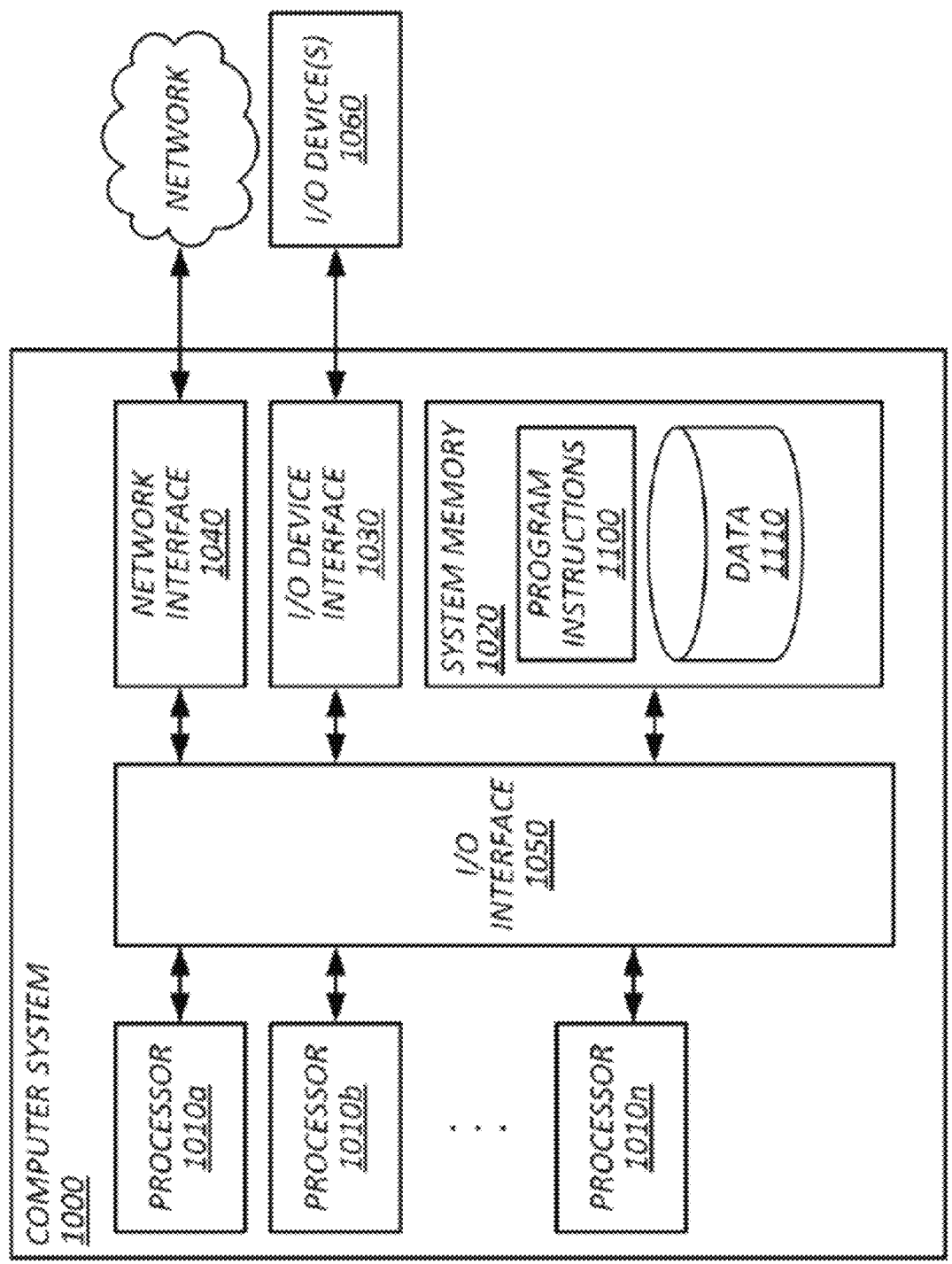
FIG. 6 illustrates a block diagram depicting an example of a computing device by which the above techniques may be implemented.

Some embodiments may execute the above operations on a computer system, such as the computer system of FIG. 6, which is a diagram that illustrates a computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A method for verifying an identity of a user, comprising:

receiving, from a device of a user, a request to verify an identity of the user;

receiving, from the device of the user, an initial user identifier by which a record associated with an asserted user identity is identifiable;

obtaining, from the device of the user, at least two device verification values;

obtaining, based on the record associated with the asserted user identity, information corresponding to a verifying user having permissions to attest to the identity of the user;

issuing, to the verifying user, a notification indicative of a pending identity verification request corresponding to the user;

receiving, from a verifying device accessing the notification, a selection to establish a communication session with the device of the user and providing for review by the verifying user on the verifying device the at least two device verification values;

establishing a chat session between the verifying device and the device of the user, wherein:

at least one attachment is detected as being uploaded by the device of the user; and at least one audio or video communication session is detected between the verifying device and the device of the user;

after the detecting, receiving a selection performed by the verifying user on the verifying device to attest to the identity of the user as being the asserted user identity; and in response to receiving the selection attesting to the identity of the user, permissioning establishment of a credential on the device of the user for the asserted user identity.

2. The method of claim 1, wherein receiving, from a device of a user, a request to verify an identity of the user comprises:

receiving the request via a web page accessed by the device with a web browser, receiving the request via a web application accessed by the device with the web browser, receiving the request via an application programming interface, or receiving the request via an identity management application executed by the device.

3. The method of claim 1, wherein an initial user identifier is:

a username corresponding to the asserted user identity, an email address corresponding to the asserted user identity, a given name corresponding to the asserted user identity, or an identification number corresponding to the asserted user identity.

4. The method of claim 1, wherein obtaining, from the device of the user, at least two device verification values comprises:

obtaining a code transmitted to an account corresponding to the asserted user identity; and obtaining at least one location value.

5. The method of claim 4, wherein obtaining a code transmitted to an account corresponding to the asserted user identity comprises:

transmitting the code to a mobile telephone number associated with the asserted user identity, transmitting the code to an email address associated with the asserted user identity, or transmitting the code to a messaging service account associated with the asserted user identity.

6. The method of claim 4, wherein obtaining at least one location value comprises one or more of:

obtaining global positioning system (GPS) location reported by a GPS receiver of the device, obtaining an internet protocol-based location reported for the device, or obtaining a wireless carrier-based location reported for the device.

7. The method of claim 1, wherein obtaining, based on the record associated with the asserted user identity, information corresponding to a verifying user having permissions to attest to the identity of the user comprises:

obtaining user account information corresponding to the verifying user and transmitting the notification indicative of the pending identity verification request corresponding to the user based on the user account information.

8. The method of claim 1, wherein obtaining, based on the record associated with the asserted user identity, information corresponding to a verifying user having permissions to attest to the identity of the user comprises:

obtaining verifying device information corresponding to the verifying user and transmitting the notification indicative of the pending identity verification request corresponding to the user to the verifying device.

9. The method of claim 1, wherein receiving, from a verifying device accessing the notification, a selection to establish a communication session with the device of the user comprises:

receiving indication of the selection within a web page accessed by the verifying device under an account of the verifying user with a web browser, receiving indication of the selection within a web application accessed by the device under the account of the verifying user with the web browser, or receiving indication of the selection within an identity verification application executing on the verifying device of the verifying user.

10. The method of claim 1, wherein providing for review by the verifying user on the verifying device the at least two device verification values comprises transmitting:

an indication of verification of a code received from the device, and an indication of a location corresponding to the device.

11. The method of claim 1, wherein establishing a chat session between the verifying device and the device of the user comprises:

initializing a first chat interface for display by the verifying device to the verifying user; and initializing a second chat interface for display by the device to the user, wherein messages received from the respective devices are displayed within the chat interfaces.

12. The method of claim 11, wherein detecting the at least one attachment as being uploaded by the device of the user comprises:

obtaining an indication of a selection of a user interface element within the second chat interface to capture an image with the device of the user or select an image or a file on the device of the user; and receiving a selected file or image or a captured image submitted by the device of the user within the second chat interface, the submitting causing the selected file or image or the captured image to be displayed within the first chat interface.

13. The method of claim 11, wherein detecting at least one audio or video communication session between the verifying device and the device of the user comprises:

obtaining an indication of a selection of a user interface element within the second chat interface or the first chat interface to establish an audio or video communication session; and establishing, responsive to the indication of the selection, the audio or video communication session between the verifying device and the device of the user.

14. The method of claim 11, wherein permissioning establishment of a credential on the device of the user for the asserted user identity comprises:

transmitting, to the device of the user, a selectable link displayed within the second chat interface, the selectable link configured to cause the device of the user to request the establishment of credentials.

15. The method of claim 14, wherein the selectable link is a deep link into a native application.

16. The method of claim 1, wherein permissioning establishment of a credential on the device of the user for the asserted user identity comprises:

transmitting, to the device of the user, a registration code for requesting the establishment of credentials.

17. The method of claim 16, wherein the registration code is a selectable link that when selected causes the device of the user to request the establishment of credentials.

18. The method of claim 1, wherein establishment of a credential on the device of the user for the asserted user identity comprises:
receiving a public key of a public-private key pair generated on the device of the user; and
associating the public key with a record corresponding to the asserted user identity.

19. The method of claim 18, wherein one or more user credentials are established on the device of the user to govern access to the private key by the device subject to authentication of the user by the device on the one or more user credentials.

20. The method of claim 1, further comprising:
permitting the device of the user access to a resource under the asserted user identity based on the credential.

21. A non-transitory computer-readable medium storing instructions that when executed by one or more processors cause the one or more processors to effectuate operations comprising:
receiving, from a device of a user, a request to verify an identity of the user;
receiving, from the device of the user, an initial user identifier by which a record associated with an asserted user identity is identifiable;
obtaining, from the device of the user, at least two device verification values;
obtaining, based on the record associated with the asserted user identity, information corresponding to a verifying user having permissions to attest to the identity of the user;
issuing, to the verifying user, a notification indicative of a pending identity verification request corresponding to the user;
receiving, from a verifying device accessing the notification, a selection to establish a communication session with the device of the user and providing for review by the verifying user on the verifying device the at least two device verification values;
establishing a chat session between the verifying device and the device of the user, wherein:
at least one attachment is detected as being uploaded by the device of the user; and
at least one audio or video communication session is detected between the verifying device and the device of the user;
after the detecting, receiving a selection performed by the verifying user on the verifying device to attest to the identity of the user as being the asserted user identity; and
in response to receiving the selection attesting to the identity of the user, permissioning establishment of a credential on the device of the user for the asserted user identity.

22. The non-transitory computer-readable medium of claim 21, wherein receiving, from a device of a user, a request to verify an identity of the user comprises:
receiving the request via a web page accessed by the device with a web browser, receiving the request via a web application accessed by the device with the web browser,
receiving the request via an application programming interface, or
receiving the request via an identity management application executed by the device.

23. The non-transitory computer-readable medium of claim 21, wherein an initial user identifier is:
a username corresponding to the asserted user identity,
an email address corresponding to the asserted user identity,
a given name corresponding to the asserted user identity, or
an identification number corresponding to the asserted user identity.

24. The non-transitory computer-readable medium of claim 21, wherein obtaining, from the device of the user, at least two device verification values comprises:
obtaining a code transmitted to an account corresponding to the asserted user identity; and
obtaining at least one location value.

25. The non-transitory computer-readable medium of claim 24, wherein obtaining a code transmitted to an account corresponding to the asserted user identity comprises:
transmitting the code to a mobile telephone number associated with the asserted user identity,
transmitting the code to an email address associated with the asserted user identity, or
transmitting the code to a messaging service account associated with the asserted user identity.

26. The non-transitory computer-readable medium of claim 24, wherein obtaining at least one location value comprises one or more of:
obtaining global positioning system (GPS) location reported by a GPS receiver of the device,
obtaining an internet protocol-based location reported for the device, or
obtaining a wireless carrier-based location reported for the device.

27. The non-transitory computer-readable medium of claim 21, wherein obtaining, based on the record associated with the asserted user identity, information corresponding to a verifying user having permissions to attest to the identity of the user comprises:
obtaining user account information corresponding to the verifying user and transmitting the notification indicative of the pending identity verification request corresponding to the user based on the user account information.

28. The non-transitory computer-readable medium of claim 21, wherein obtaining, based on the record associated with the asserted user identity, information corresponding to a verifying user having permissions to attest to the identity of the user comprises:
obtaining verifying device information corresponding to the verifying user and transmitting the notification indicative of the pending identity verification request corresponding to the user to the verifying device.

29. The non-transitory computer-readable medium of claim 21, wherein receiving, from a verifying device accessing the notification, a selection to establish a communication session with the device of the user comprises:
receiving indication of the selection within a web page accessed by the verifying device under an account of the verifying user with a web browser,
receiving indication of the selection within a web application accessed by the device under the account of the verifying user with the web browser, or
receiving indication of the selection within an identity verification application executing on the verifying device of the verifying user.

30. The non-transitory computer-readable medium of claim 21, wherein providing for review by the verifying user on the verifying device the at least two device verification values comprises transmitting:
- an indication of verification of a code received from the device, and
- an indication of a location corresponding to the device.

31. The non-transitory computer-readable medium of claim 21, wherein establishing a chat session between the verifying device and the device of the user comprises:
- initializing a first chat interface for display by the verifying device to the verifying user; and
- initializing a second chat interface for display by the device to the user, wherein messages received from the respective devices are displayed within the chat interfaces.

32. The non-transitory computer-readable medium of claim 31, wherein detecting the at least one attachment as being uploaded by the device of the user comprises:
- obtaining an indication of a selection of a user interface element within the second chat interface to capture an image with the device of the user or select an image or a file on the device of the user; and
- receiving a selected file or image or a captured image submitted by the device of the user within the second chat interface, the submitting causing the selected file or image or the captured image to be displayed within the first chat interface.

33. The non-transitory computer-readable medium of claim 31, wherein detecting at least one audio or video communication session between the verifying device and the device of the user comprises:
- obtaining an indication of a selection of a user interface element within the second chat interface or the first chat interface to establish an audio or video communication session; and
- establishing, responsive to the indication of the selection, the audio or video communication session between the verifying device and the device of the user.

34. The non-transitory computer-readable medium of claim 31, wherein permissioning establishment of a credential on the device of the user for the asserted user identity comprises:
- transmitting, to the device of the user, a selectable link displayed within the second chat interface, the selectable link configured to cause the device of the user to request the establishment of credentials.

35. The non-transitory computer-readable medium of claim 34, wherein the selectable link is a deep link into a native application.

36. The non-transitory computer-readable medium of claim 21, wherein permissioning establishment of a credential on the device of the user for the asserted user identity comprises:
- transmitting, to the device of the user, a registration code for requesting the establishment of credentials.

37. The non-transitory computer-readable medium of claim 36, wherein the registration code is a selectable link that when selected causes the device of the user to request New establishment of credentials.

38. The non-transitory computer-readable medium of claim 21, wherein establishment of a credential on the device of the user for the asserted user identity comprises:
- receiving a public key of a public-private key pair generated on the device of the user; and
- associating the public key with a record corresponding to the asserted user identity.

39. The non-transitory computer-readable medium of claim 38, wherein one or more user credentials are established on the device of the user to govern access to the private key by the device subject to authentication of the user by the device on the one or more user credentials.

40. The non-transitory computer-readable medium of claim 21, the operations further comprising:
- permitting the device of the user access to a resource under the asserted user identity based on the credential.

* * * * *